(12) United States Patent
Silva et al.

(10) Patent No.: US 12,450,874 B2
(45) Date of Patent: Oct. 21, 2025

(54) CONFIGURING A SENSING SYSTEM FOR AN EMBEDDED DEVICE

(71) Applicant: EdgeImpulse Inc., San Jose, CA (US)

(72) Inventors: Jorge Silva, Toronto (CA); Sheena Patel, Dallas, TX (US); Johannes Jongboom, Amsterdam (NL)

(73) Assignee: EdgeImpulse Inc., San Diego, CA (US)

( * ) Notice: Subject to any disclaimer, the term of this patent is extended or adjusted under 35 U.S.C. 154(b) by 410 days.

(21) Appl. No.: 18/184,805

(22) Filed: Mar. 16, 2023

(65) Prior Publication Data

US 2024/0312182 A1 Sep. 19, 2024

(51) Int. Cl.
*G06V 10/764* (2022.01)
*G06T 7/62* (2017.01)
*G06T 7/70* (2017.01)
*G06T 17/00* (2006.01)
*G06V 10/28* (2022.01)

(52) U.S. Cl.
CPC .............. *G06V 10/764* (2022.01); *G06T 7/62* (2017.01); *G06T 7/70* (2017.01); *G06T 17/00* (2013.01); *G06V 10/28* (2022.01); *G06T 2207/10024* (2013.01); *G06T 2207/30242* (2013.01)

(58) Field of Classification Search
CPC .......... G06T 17/00; G06T 2207/10024; G06T 2207/30242; G06T 7/62; G06T 7/70; G06V 10/28; G06V 10/764
See application file for complete search history.

(56) References Cited

U.S. PATENT DOCUMENTS

| | | | |
|---|---|---|---|
| 9,305,241 B2 | 4/2016 | Pope | |
| 10,796,457 B2 | 10/2020 | Beek | |
| 10,878,583 B2 | 12/2020 | Schmid et al. | |
| 2020/0082607 A1* | 3/2020 | Degtyarev | ................ G06T 5/70 |
| 2020/0258249 A1 | 8/2020 | Angelova et al. | |

* cited by examiner

*Primary Examiner* — Manuchehr Rahmjoo
(74) *Attorney, Agent, or Firm* — Polsinelli LLP

(57) ABSTRACT

A system may configure a sensing system implemented by an embedded device. The system may configure a sensing system to generate an image from a point cloud including data points in three dimensions. The data points may be associated with at least three values. The image may be generated by mapping first and second values of data points to first and second coordinates of pixels of the image and third values of data points to intensities of the pixels. The system may configure a sensing system to invoke a machine learning model to process the image. The machine learning model may be trained for image processing. In some implementations, the mapping may include quantizing the first and second values into ranges of the first and second coordinates and quantizing the third values into a range of the intensities.

19 Claims, 23 Drawing Sheets

NN CLASSIFIER (Edge Impulse Inc. / Tutorial: Recognize Sounds From Audio) #1 ▼

Neural Network settings ← 710

Training settings

Number of training cycles: 30
Learning rate: 0.001
Validation set size: 20 %
Auto-balance dataset ☐

Audio training options

Data augmentation ☐

Neural network architecture

Input layer (3,960 features)
Reshape layer (40 columns)
1D conv / pool layer (8 neurons, 3 kernel size, 1 layer)
Dropout (rate 0.25)
1D conv / pool layer (16 neurons, 3 kernel size, 1 layer)
Dropout (rate 0.25)
Flatten layer
Output layer (2 classes)

Model Model version: ⓘ Quantized (int8) ▼ ← 720

Last training performance (validation set)

Accuracy 99.8%  Loss 0.00

Confusion matrix (validation set)

| | FAUCET | NOISE |
|---|---|---|
| FAUCET | 99.7% | 0.3% |
| NOISE | 0% | 100% |
| F1 SCORE | 1.00 | 1.00 |

Feature explorer (full training set) ← 730
○ faucet - correct
◐ noise - correct
● faucet - incorrect vis. layer 3
vis. layer 2
vis. layer 1

On-device perf. ⓘ ← 740

Inferencing Time: 20 ms.
Peak RAM Usage: 10.9 KB
Flash Usage: 31.0 KB

Input (?)
↔ 1000 ms | ↦ 1000 ms
Spectrogram (?)
↦ 0.075 | ↦ 0.0375 | ≡ -52
Keras (?)

| Type | Filters | Kernel | Rate |
|---|---|---|---|
| Data augmentation | | | |
| conv1d | 16 | 3 | - |
| conv1d | 32 | 3 | - |
| dropout | - | - | 0.5 |

100%  spectr-conv1d-f13  10/4/2021 9:50:07 AM

910B

Input (?)
↔ 2000 ms | ↦ 1000 ms
Spectrogram (?)
↦ 0.075 | ↦ 0.075 | ≡ -72
Keras (?)

| Type | Filters | Kernel | Rate |
|---|---|---|---|
| conv1d | 16 | 3 | - |
| conv1d | 32 | 3 | - |
| conv1d | 64 | 3 | - |
| conv1d | 128 | 3 | - |
| dropout | - | - | 0.5 |

100%  spectr-conv1d-43c  10/4/2021 9:34:01 AM

910C

Input (?)
↔ 1000 ms | ↦ 1000 ms
Spectrogram (?)
↦ 0.05 | ↦ 0.05 | ≡ 40
Keras (?)

| Type | Filters | Kernel | Rate |
|---|---|---|---|
| Data augmentation | | | |
| conv1d | 16 | 3 | - |
| conv1d | 32 | 3 | - |
| conv1d | 64 | 3 | - |
| dropout | - | - | 0.25 |

100%  spectr-conv1d-cf7  10/4/2021 9:34:33 AM

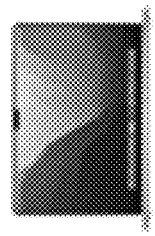
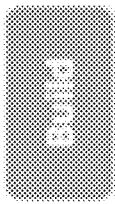
FIG. 13

CONFIGURING A SENSING SYSTEM FOR AN EMBEDDED DEVICE

TECHNICAL FIELD

This disclosure relates generally to machine learning and, more specifically, to configuring a sensing system for an embedded device.

BACKGROUND

Machine learning, or artificial intelligence, refers to a system that uses data to perform tasks. A machine learning model may be built for a system based on training data (e.g., a dataset). The machine learning model may then be deployed to make predictions (e.g., predictions that an application can use to help guide decisions, such as predictions for image or sound classification), to generate data, and/or to transform data.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is an illustration of an example of a GUI indicating configuration of a machine learning component of a pipeline.

FIG. 9 is an illustration of an example of a GUI indicating multiple configurations of a pipeline.

FIG. 13 is an illustration of an example of a GUI indicating deployment of a configuration of a pipeline to a computer or a mobile phone.

DETAILED DESCRIPTION

Figure 1:
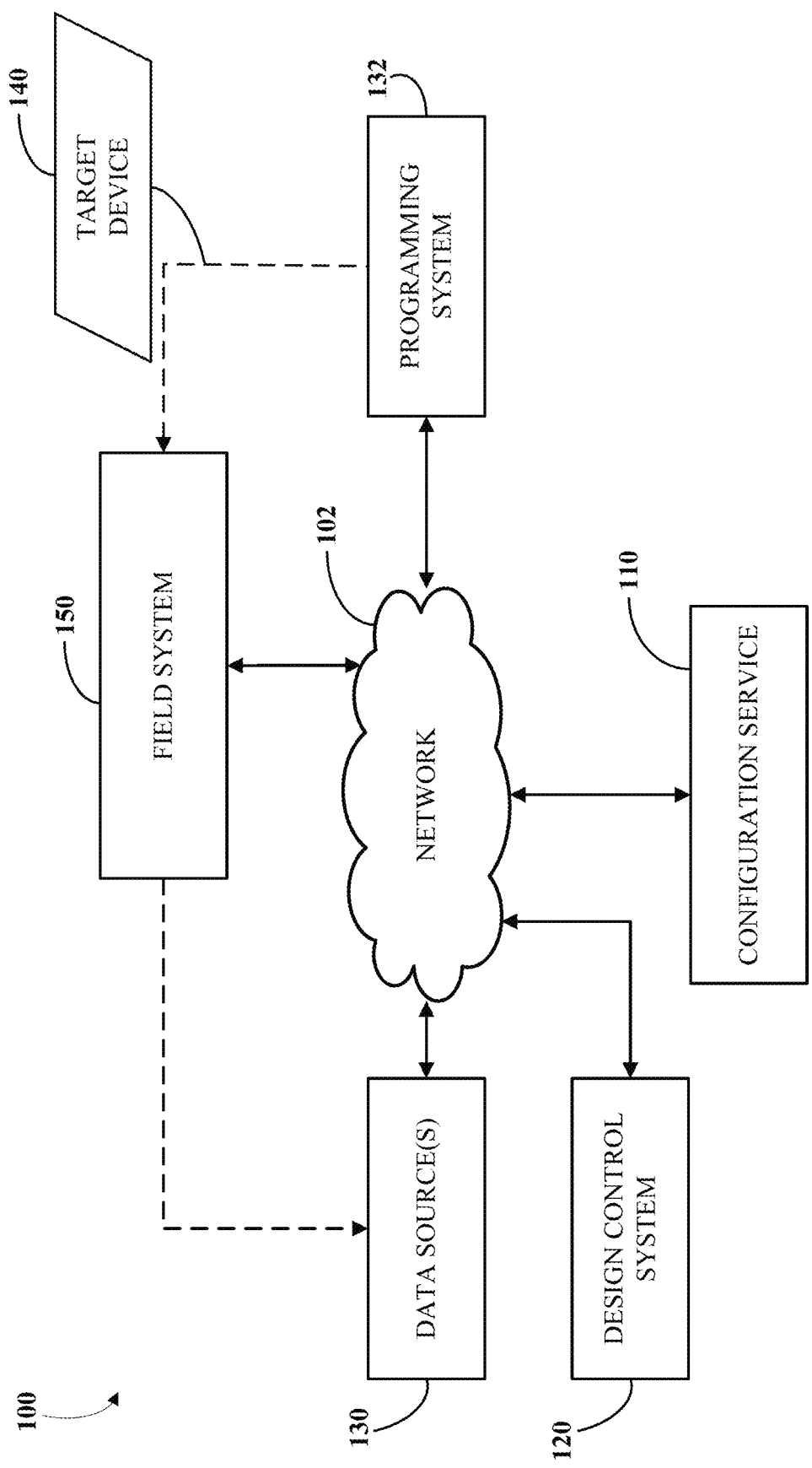
FIG. 1 is a block diagram of an example of a system for facilitating configuration and deployment of a pipeline.

Embedded machine learning permits an electronic device, such as a microcontroller, to implement a machine learning model to make predictions (e.g., that an application can use to help guide decisions), to generate data, and/or to transform data. For example, a device with embedded machine learning may receive a sample of data (e.g., input from a sensor) and may use a machine learning model to predict a result based on the sample without accessing software in the cloud. However, there are different ways a machine learning model may be configured for a given application. For example, the machine learning model may include an artificial neural network (or simply a "neural network"), and hyperparameters associated with the neural network may be configured in different ways to achieve different levels of accuracy and/or inference times.

Additionally, there may be constraints associated with a given application. For example, a machine learning model used to predict the busyness of a shopping center might tolerate a greater inference time (e.g., an amount of time for the machine learning model to process input data and produce output data, such as a prediction) than a machine learning model used to predict the movement of an unmanned aerial vehicle (UAV) that may be in flight. Further, there are different devices that could be used when implementing a machine learning model. For example, one device might be more complex with a processor that includes a more execution units, a deep learning accelerator, support for floating point (FP) instructions, and instruction and data caches, while another device might be less complex with a processor that includes a fewer execution units, a lack of support for FP instructions, and a lack of instruction and data caches. In some cases, the device that is more complex could have a heterogenous architecture that uses multiple types of processors and instruction sets. Moreover, the different devices might operate at different clock frequencies. Thus, the performance of such devices may vary.

Additionally, implementing the machine learning model on the different devices may involve utilizing different software toolchains, with the more complex devices sometimes involving more complex software in the toolchain that may be difficult for a user to configure. As a result, it may be time consuming and/or difficult for an engineer to configure a machine learning model for a given application and/or a given device, or for an engineer to port a given application onto multiple different devices. It is therefore desirable to implement a machine learning model for a given application and/or a given device while reducing the time and/or the burden associated with the implementation.

Implementations of this disclosure address problems such as these by receiving an input indicating a target device (e.g., a specified microcontroller, board, computer, or mobile phone) and automatically determining the performances of multiple configurations of a pipeline (sometimes referred to as machine learning pipeline or an impulse), based on the target device indicated by the input, for implementing a configuration of the multiple configurations on the target device. The pipeline may include one or more signal processing components (e.g., one or more components implementing a digital signal processing (DSP) algorithm) and one or more machine learning components (e.g., one or more components implementing conditional logic, a neural network, a heuristic algorithm, or other learning algorithm or classifier). The one or more signal processing components and the one or more machine learning components may be connected to one another in various ways.

A configuration of the pipeline may include one or more parameters for configuring the signal processing component (e.g., settings that affect signal processing calculations, such as a particular DSP algorithm or noise floor) and/or the machine learning component (e.g., settings that affect machine learning, such as hyperparameters including neural network topology, size, or training). Configurations of the multiple configurations may vary in the one or more parameters that are used, and therefore may vary in configurations of the one or more signal processing components and/or the one or more machine learning components. The performance of a configuration may be determined based on the target device, and the target device may be indicated by the input. For example, the target device may be indicated by a user via selection of the target device from a library of multiple possible target devices. The target device could be, for example, a device (e.g., a microcontroller or board), a computer, or a mobile phone. In some implementations, the target device could comprise a system running in a cloud server. The performance of a configuration may also be determined based on an application constraint (e.g., a targeted latency, accuracy, memory usage, and/or energy usage), and the application constraint may be indicated by an input. For example, the application constraint may be indicated by a user for meeting the needs of a given application (e.g., achieving a shorter inference time for predicting the movement of a UAV).

In some implementations, the performance of a configuration may be determined by calculating a latency (e.g., an inference time), a memory usage (e.g., a random access memory (RAM) and/or a read only memory (ROM) usage), an energy usage (e.g., power consumption), and/or level of accuracy associated with the configuration when implemented on the target device. For example, the latency, or inference time, may be an amount of time for the configuration of the pipeline to process input data and produce output data when the configuration is implemented on a target device; the memory usage may be a peak amount of RAM and/or a peak amount of ROM, measured in kilobytes or megabytes, consumed by the target device when implementing the configuration; the energy usage may be a peak amount of power, measured in watts, consumed by the target device when implementing the configuration; and the accuracy may be a fraction or percentage of predictions that the target device correctly determines when implementing the configuration. In some implementations, the performance (e.g., the latency, memory usage, energy usage, or accuracy) of a configuration may be determined by simulating the target device implementing the configuration (e.g., determining the performance based on characteristics of the target device, such as the architecture of a device). In some implementations, the performance of a configuration may be determined by referencing one or more benchmarks associated with the target device (e.g., predetermined performance data from a look up table or other data structure) and applying the one or more benchmarks to estimate the performance of the configuration when the target device implements the configuration. In some cases, a machine learning model or heuristic algorithm may be used to predict the performance of the configuration based on the one or more benchmarks. This may permit determining the performance more quickly when using benchmarks. In some implementations, the configurations may be ranked based on their performances. In some implementations, the performance of a configuration may be compared to an application constraint (e.g., a targeted latency, accuracy, memory usage, and/or energy usage) indicated by an input. In some implementations, a configuration may be selected, based on the configuration satisfying the application constraint, for implementing the configuration on the target device (e.g., a microcontroller or board implementing a given architecture). In some implementations, the configuration may be implemented on a target device by utilizing a software toolchain for the target device, such as for generating firmware. In some implementations, implementing the configuration on a target device may include determining portions of the pipeline to be implemented on various cores of a heterogenous device, and distributing a computational workload associated with the pipeline across the various cores. In some implementations, a graphical user interface (GUI) may be used when configuring the pipeline.

As a result, a pipeline including one or more signal processing components and one or more machine learning components may be determined for an application and/or a device while reducing the time and/or the burden associated with making the determination. Further, the pipeline may be implemented on a target device while reducing the time and/or the burden associated with utilizing the software toolchain for the target device. Additionally, by determining configurations that include signal processing and machine learning components, trade-offs between signal processing efficiency (e.g., utilization of the signal processing component) and machine learning efficiency (e.g., utilization of the machine learning component) may be achieved.

In some cases, it may be desirable to make predictions from point cloud data. A point cloud may include data points in three dimensions, such as data points collected from a millimeter wave sensor connected to a vehicle. Each data point can include multiple values associated with it (e.g., dimensions), such as spatial coordinates, signal to noise ratio (SNR), and time relative to other scan frames. However, when the data points are spatially correlated, as opposed to temporally correlated, the data points cannot be treated as windowed time-series data. This may cause difficulty for machine learning models to process the data points. For example, a machine learning model may not be able to take a window of the input data (e.g., a timed duration, such as one second) and classify the contents of the window with respect to whether it contains a particular signal. Further, the data points may be generated as an unordered, variable size list representing a sparse scan frame. This may also cause difficulty for machine learning models to process. For example, a machine learning model may rely on fixed size, and consistent pattern representations, for the input data. When receiving data points as an unordered, variable size list, the machine learning model may have difficulty processing them. This may be further complicated when implementing the machine learning model on an embedded device (e.g., a microcontroller) limited by power, processing speed, and/or memory. For example, due to the constraints of the embedded device, a machine learning model may be limited in size, including the number of possible inputs that it can receive.

Implementations of this disclosure address problems such as these by configuring a sensing system to transform three dimensional data points of a point cloud into a two dimensional digital image to enable a machine learning model to process the data as an image (e.g., to invoke computer vision processing, such as object classification and/or object detection). A system may configure the sensing system for an embedded device, such as microcontroller. The sensing system can receive a point cloud from a sensor, such as a millimeter wave sensor. The point cloud may include data points in three dimensions (e.g., given by spatial coordinates, such as radius, azimuth, and height in cylindrical coordinates, or radius, polar angle, and azimuthal angle in spherical coordinates). The data points may be associated with at least three values (e.g., spatial coordinates, SNR, and time relative to other frames). The sensing system can generate an image from the point cloud by mapping first and second values of data points (e.g., azimuth and height) to first and second coordinates of pixels of the image (e.g., locations of pixels of the image, which may be given by X and Y coordinates in a Cartesian coordinate system) and third values of data points (e.g., range) to intensities of the pixels (e.g., brightness of a pixel for a monochrome image, or color channels for a Red, Green, Blue (RGB) image). The mapping may include quantizing the first and second values into ranges of the first and second coordinates and quantizing the third values into a range of the intensities.

In some implementations, the system may also determine a size of the image, including a number of pixels (e.g., 8×8 pixels, or 256×256 pixels), based on a size of the point cloud, including a number of data points. In some implementations, the mapping may include mapping the third values of data points to a first color of the pixels (e.g., Red) and fourth values of data points to a second color of the pixels (e.g., Green). Unused colors could default to zero (e.g., Black, or no color present). In some implementations, the mapping may include mapping the third values of data points to a first color (e.g., Red) and a first portion of a second color (e.g., one half of Green) of the pixels and mapping fourth values of data points to a second portion of the second color (e.g., the other half of Green) and a third color of the pixels (e.g., Blue). In some implementations, the system may select the third values to correspond to the radius of the data points, so that the image visually results in a "heat map" when displayed by a graphical user interface (GUI) for a user. The sensing system can invoke a machine learning model to process the image. The machine learning model may be trained for image processing, such as object classification or object detection. As a result, an unordered, variable size point cloud may be translated into a fixed size, normalized "heat map" image that aggregates data in a consistent manner, which can be conveniently processed with a machine learning model configured for image processing.

FIG. 1 is a block diagram of an example of a system 100 for facilitating configuration and deployment of a pipeline. The system 100 may include a network 102, a configuration service 110 (e.g., a machine learning pipeline or impulse configuration service), a design control system 120, one or more data sources 130, a programming system 132, and/or a field system 150. A user may utilize the design control system 120 to command the configuration service 110 via network communications over the network 102. For example, a user may utilize a web client or a scripting application program interface (API) client that may be implemented by the design control system 120 to command the configuration service 110.

The configuration service 110 may be used to configure a pipeline to be implemented by a target device. The pipeline may include one or more signal processing components and one or more machine learning components that may be connected to one another in various ways. The target device may be indicated by a user, such as by selection of a target device from a library of multiple possible target devices. For example, the user may utilize the design control system 120 to indicate the selection of the target device to the configuration service 110. The target device could be, for example, a device (e.g., a microcontroller or board), a computer, or a mobile phone. In some implementations, the target device could comprise a system running in a cloud server.

The one or more data sources 130 may be used to provide input data (e.g., raw data) to the configuration service 110 via network communications over the network 102. The input data may be used by the configuration service 110 to generate one or more datasets that may be used to configure, train, and/or test a configuration of the pipeline. The one or more data sources 130 could be selected and/or configured by the user via the design control system 120. The one or more data sources 130 could also be configured by the configuration service 110 for transferring the input data from the one or more data sources 130 to the configuration service 110. The one or more data sources 130 may include, for example, one or more servers, computers, mobile phones, or other electronic devices, such as microcontrollers or boards.

The configuration service 110 may deploy a configuration of the pipeline to a target device 140. In some implementations, the target device 140 could be a device, such as a microcontroller or board. The configuration service 110 may communicate with the programming system 132 via network communications over the network 102 to program the target device 140 (e.g., the device). For example, the configuration service 110 may generate software and/or firmware for deploying the configuration of the pipeline. The configuration service 110 may communicate with the programming system 132 to send the software and/or firmware to the programming system 132. The programming system 132 may use the software and/or firmware to program the target device 140 (e.g., the configuration service 110 may generate a binary that the programming system 132 may use to flash, or program the ROM, of the device). Thus, the target device 140, when programmed, may implement a configuration of the pipeline that may be used for machine learning on a target device having constraints (e.g., embedded machine learning).

In some implementations, the target device 140 could be a computer or a mobile phone. The configuration service 110 may communicate with the computer or the mobile phone, via network communications over the network 102, to program the computer or the mobile phone. For example, the configuration service 110 may generate software for deploying the configuration of the pipeline to the computer or the mobile phone. The configuration service 110 may communicate with the computer or the mobile phone to send the software to the computer or the mobile phone for the computer or the mobile phone to execute. Thus, the computer or the mobile phone, when using the software, may implement a configuration of the pipeline that may be used for machine learning on a target having constraints (e.g., embedded machine learning). In some cases, the configuration service 110 may generate software for deploying the configuration of the pipeline to a library. A computer or other device, such as the target device 140, may use the library to implement a configuration of the pipeline.

In some implementations, the target device 140 may be implemented in the field system 150. The field system could be an intelligent device that uses the target device 140 to make predictions that can help guide decisions for an application. For example, the field system 150 could be an edge device, a medical device, a wearable device, or other device including a processor.

In some implementations, the field system 150, implementing the target device 140, may also serve as a data source like the one or more data sources 130. For example, the target device 140 may be used to provide input data to the configuration service 110, via the field system 150 and network communications over the network 102. The configuration service 110 may use the input data from the target device 140, like input data from the one or more data sources 130, to configure, train, and/or test a pipeline implemented by the target device 140 and/or another pipeline to be implemented by another target device.

Figure 2:
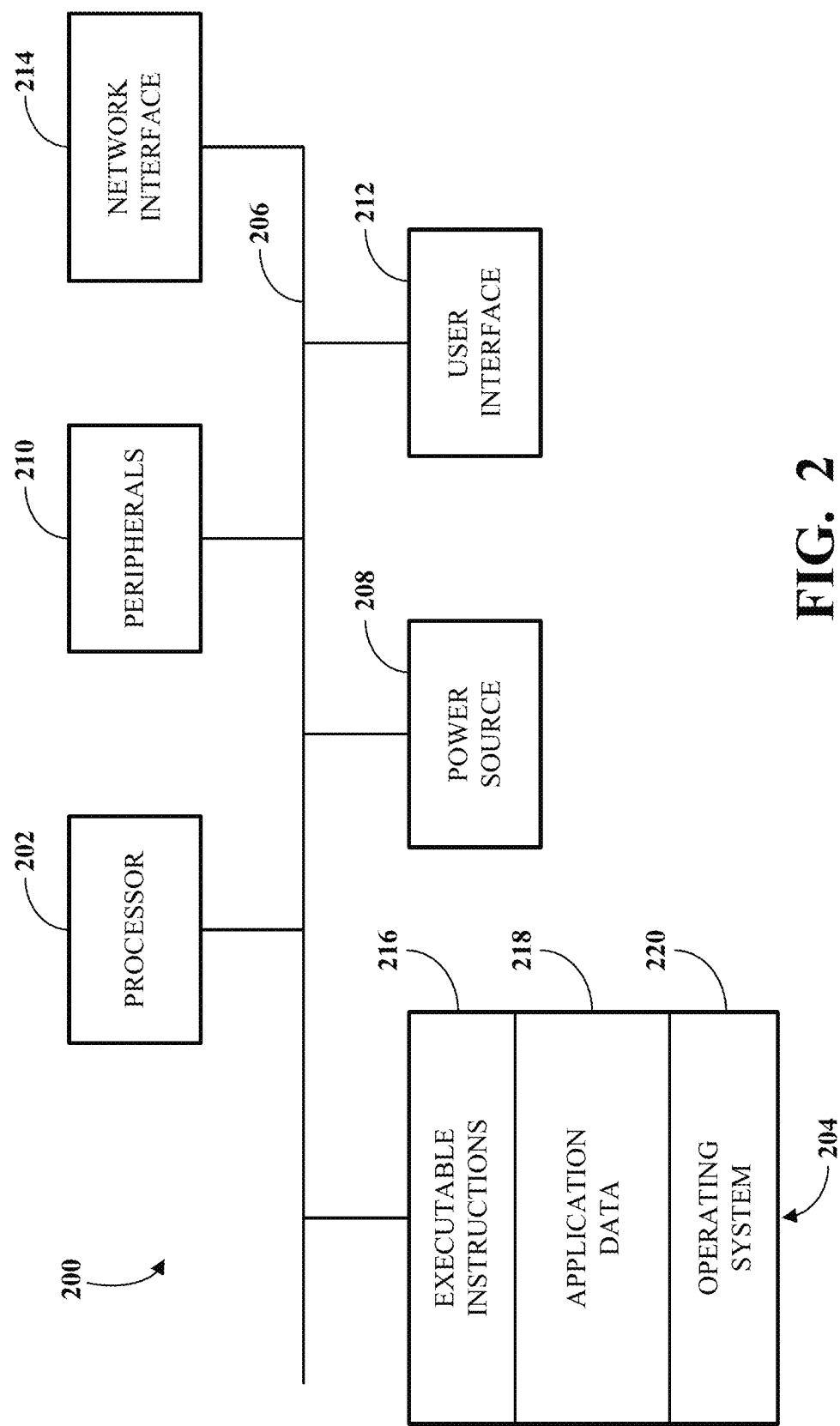
FIG. 2 is a block diagram of an example internal configuration of a computing device for facilitating configuration and deployment of a pipeline.

FIG. 2 is a block diagram of an example internal configuration of a computing device 200 for facilitating configuration and deployment of a pipeline. The computing device 200 may implement one or more of the configuration service 110, the design control system 120, the one or more data sources 130, the programming system 132, the target device 140, or the field system 150 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a dynamic random access memory (DRAM) module, such as double data rate (DDR) synchronous DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220, when present, can be, for example, Microsoft Windows®, Mac OS X®, or Linux®; an operating system for a mobile device, such as a smartphone or tablet device; or an operating system for a non-mobile device, such as a mainframe computer. For example, a target device that is an embedded device might not have an operating system.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 102 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
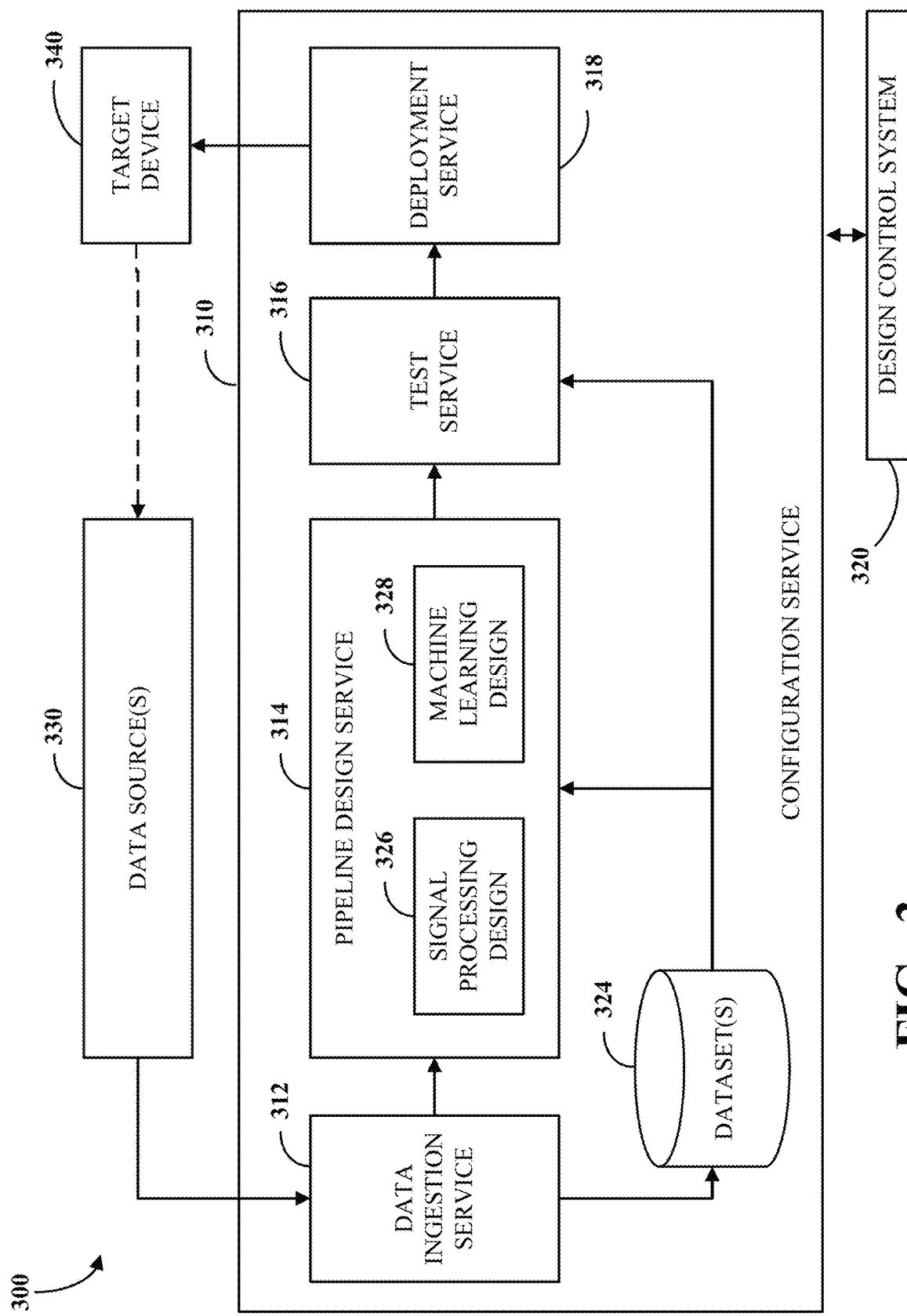
FIG. 3 is a block diagram of an example of a system for configuring a pipeline including a signal processing component and a machine learning component.

FIG. 3 is a block diagram of an example of a system 300 for configuring a pipeline including a signal processing component and a machine learning component. The system 300 may include a configuration service 310, a design control system 320, one or more data sources 330, and a target device 340 like the configuration service 110, the design control system 120, the one or more data sources 130, and the target device 140 shown in FIG. 1, respectively.

The configuration service 310 may be a software platform instantiated using one or more servers at one or more datacenters. The configuration service 310 may include a data ingestion service 312, a pipeline design service 314, a test service 316, and a deployment service 318. The data ingestion service 312 may receive input data from the one or more data sources 330. The input data may be used by the configuration service 310 to generate one or more datasets that may be used to configure, train, and/or test a configuration of the pipeline. The one or more datasets may be stored by the configuration service 310 in a database 324. The one or more data sources 330 could be selected and/or configured by the user via the design control system 320. The one or more data sources 330 could also be configured by the configuration service 310, such as for transferring the input data from the one or more data sources 330 to the configuration service 310. The one or more data sources 330 may include, for example, one or more servers, computers, mobile phones, or other electronic devices, such as microcontrollers or boards.

The pipeline design service 314 may be used to configure one or more configurations of a pipeline (e.g., a machine learning pipeline or impulse) to be implemented on the target device 340 (e.g., a specified microcontroller, board, computer, or mobile phone). The pipeline design service 314 may utilize a signal processing design service 326 and/or a machine learning design service 328 to configure a configuration of the pipeline. The signal processing design service 326 may be used to configure one or more signal processing components (e.g., one or more components implementing a DSP algorithm) for the pipeline. The machine learning design service 328 may be used to configure one or more machine learning components (e.g., one or more components implementing conditional logic, a neural network, a heuristic algorithm, or other learning algorithm, such as a classifier) for the pipeline. The signal processing components and the machine learning components may be connected to one another in various ways by the pipeline design service 314 (e.g., in series or in parallel). In one example, a signal processing component may be arranged in a first stage to pre-process data, followed by a machine learning component arranged in a second stage in series to process data. In another example, a first signal processing component may be arranged in a first stage to pre-process data, followed by a second signal processing component arranged in a second stage in series to further pre-process data, followed by a machine learning component arranged in a third stage in series to process data (e.g., multiple signal processing components). In another example, a signal processing component may be arranged in a first stage to pre-process data, followed by a first machine learning component arranged in a second stage in series to process data, followed by a second machine learning component arranged in a third stage in series to post-process data (e.g., multiple machine learning components). In some cases, the one or more signal processing components and/or the one or more machine learning components may be connected in parallel. For example, in a first stage, a first signal processing component may pre-process data in a first path and a second signal processing component may pre-process data in a second path, in a second stage, a first machine learning component may process data from the first signal processing component in the first path and a second machine learning component may process data from the second signal processing component in the second path, and in a third stage, a third machine learning component may post-process data from the first machine learning component and the second machine learning component in the second stage. Thus, the pipeline design service 314 may permit one or more signal processing components and one or more machine learning components to be connected to one another in various ways.

Various parameters may be used to configure a configuration of the pipeline. The signal processing design service 326 may determine the parameters for configuring the one or more signal processing components, and the machine learning design service 328 may determine the parameters for configuring the one or more machine learning components. Examples of parameters for configuring a processing component may include selection of a DSP algorithm (e.g., Mel-filterbank energy (MFE), Mel frequency cepstral coefficients (MFCC), or spectrogram), frame length, frame stride, frequency bands, and normalization or noise floor. Examples of parameters for configuring a machine learning component may include selection of a learning process (e.g., conditional logic, neural network, heuristic algorithm, or other learning algorithm, such as a classifier), and hyperparameters, such as number of training cycles, learning rate, validation set size, neural network topology, neural network size, types of layers, and order of layers. For example, parameters for a neural network may configure layers as dense, 1D convolution, or 2D convolution, and/or to reshape, flatten, and/or dropout. In some implementations, the pipeline design service 314 (e.g., the signal processing design service 326 and/or the machine learning design service 328) may determine the parameters based on user input of parameters, the target device 340, an application constraint (e.g., a targeted latency, accuracy, memory usage, and/or energy usage), and/or datasets stored in the database 324. One or more of the user input of parameters, the target device 340, the application constraint, and/or the datasets may be indicated by input from a user, such as via the design control system 320. One or more parameters may be specified and/or modified by a user, such as via the design control system 320.

The test service 316 may be used to test the one or more configurations of the pipeline. In some implementations, the test service 316 may use data from datasets stored in the database 324 to test the or more configurations of the pipeline to generate feedback. For example, the test service 316 may test the one or more configurations with respect to latency (e.g., inference time), level of accuracy of predictions, memory usage (e.g., RAM and/or ROM), and/or energy usage (e.g., power consumption). The test service 316 may provide such feedback to a user, via the design control system 320, so that the user may accept or change a configuration of the pipeline based on the testing. In some implementations, the test service 316 may use the feedback to identify one or more parts of the configuration of the pipeline (e.g., a signal processing component or a machine learning component) to change.

The deployment service 318 may be used to deploy a configuration of the pipeline to the target device 340. The target device 340 may be indicated by a user via the design control system 320. In some implementations, the target device 340 may be indicated by a selection of the target device 340 from a library of multiple possible target devices. The target device 340 could be, for example, a device (e.g., a microcontroller or board), a computer, or a mobile phone. In some implementations, the target device 340 could comprise a system running in a cloud server. The deployment service 318 may utilize a software toolchain, specific to the target device 340, for generating software and/or firmware for deploying the configuration of the pipeline to the target device 340. For example, a software toolchain may include a set of programming tools (e.g., a compiler, linker, libraries, and debugger) provided by a manufacturer or vendor for programming a particular device, library, computer, or mobile phone.

In some implementations, the deployment service 318 may communicate with a programming system (e.g., the programming system 132) to send the software and/or firmware to the programming system for programming the target device 340. For example, the deployment service 318 may generate a binary that may be used to flash, or program the ROM, of a device corresponding to the target device 340. Thus, the target device 340, when programmed, may implement a configuration of the pipeline that may be used for machine learning on a target having constraints, such as in a field system like the field system 150 shown in FIG. 1. For example, the target device 340 could be an embedded device that implements embedded machine learning in the field system 150.

Thus, there may be different ways a pipeline may be configured on the target device 340. Additionally, there may be constraints associated with the target device 340, such as memory usage (e.g., RAM and/or ROM availability by the target device 340) and/or energy usage (e.g., power limitations of the target device 340), and constraints associated with application of the target device 340 in the field, such as latency (e.g., inference time) and/or level of accuracy (e.g., predictions). Further, target devices may differ from one another with respect to implementing the pipeline (e.g., the software toolchains involved to implement a configuration of the pipeline on a target device may differ), with more complex target devices sometimes involving a more complex implementation. Further, target devices may differ from one another with respect to performance (e.g., some target devices may inherently perform better than others, such as devices having more execution units and higher clock frequencies performing better than devices having fewer execution units and lower clock frequencies).

Implementations of this disclosure permit automatically determining the performances of multiple configurations of a pipeline for implementation on the target device 340. The configuration service 310 may receive input, such as selection of the target device 340, selection of application constraints (e.g., a targeted latency, accuracy, memory usage, and/or energy usage), selection of one or more data sources 330, selection of input data, and/or selection of one or more parameters. The input may be provided by a user via the design control system 320. The configuration service 310 may execute to generate multiple configurations of a pipeline based on the input (e.g., selection of the target device 340, the application constraints, the input data, and/or the one or more parameters). The multiple configurations may vary in the parameters that are used, including parameters that may be specified by the user, and therefore may vary in configurations of the one or more signal processing components (e.g., configured by the signal processing design service 326) and/or the one or more machine learning components (e.g., configured by the machine learning design service 328). Thus, the performance of a first configuration of the pipeline that may be implemented on the target device 340 may vary from the performance of a second configuration of the pipeline of the pipeline that may be implemented on the target device 340. The configuration service 310 may execute to determine the performances of the multiple configurations of the pipeline that it determines based on the input (e.g., selection of the target device 340, the application constraints, the input data, and/or the one or more parameters). The performances of the multiple configurations may be determined, for example, by calculating latencies (e.g., inference times), memory usage (e.g., RAM and/or ROM usage), energy usage (e.g., power consumption), and/or levels of accuracy associated with the configurations when implemented on the target device 340.

In some implementations, the performance of a configuration may be determined by simulating the target device 340 implementing the configuration. This may permit determining the performance based on characteristics of the target device 340, such as the particular architecture implemented by the target device 340. For example, simulating the target device 340 may include executing compiled code (e.g., computer instructions) implementing the pipeline on a virtual version of the target device 340. In some implementations, the performance of a configuration may be determined by referencing one or more benchmarks associated with the target device 340 (e.g., predetermined performance data from a look up table or other data structure) and applying the one or more benchmarks to estimate the performance of the configuration when the target device 340 implements the configuration. In some cases, a machine learning model or heuristic algorithm may be used to predict the performance of the configuration based on the one or more benchmarks. This may permit determining the performance more quickly when using benchmarks. In some implementations, the configurations may be ranked based on their performances with their relative rankings displayed to a GUI. In some implementations, the performance of a configuration may be compared to an application constraint (e.g., a targeted latency, accuracy, memory usage, and/or energy usage) indicated by an input and displayed to a GUI. In some implementations, a configuration may be selected, based on the configuration satisfying the application constraint, for implementing the configuration on the target device 340 (e.g., a microcontroller or board implementing a given architecture). In some implementations, the configuration may be implemented on the target device 340 by utilizing a software toolchain for the target device 340, such as for generating software and/or firmware that is specific to the target device 340. In some implementations, implementing the configuration on the target device 340 may include determining portions of the pipeline to be implemented on various cores of a heterogenous device (e.g., a device including multiple types of processors and instruction sets), and may include distributing a computational workload associated with the pipeline across the various cores. In some implementations, a GUI may be used when configuring the pipeline, such as a GUI displayed to a user via the design control system 320.

Figure 4:
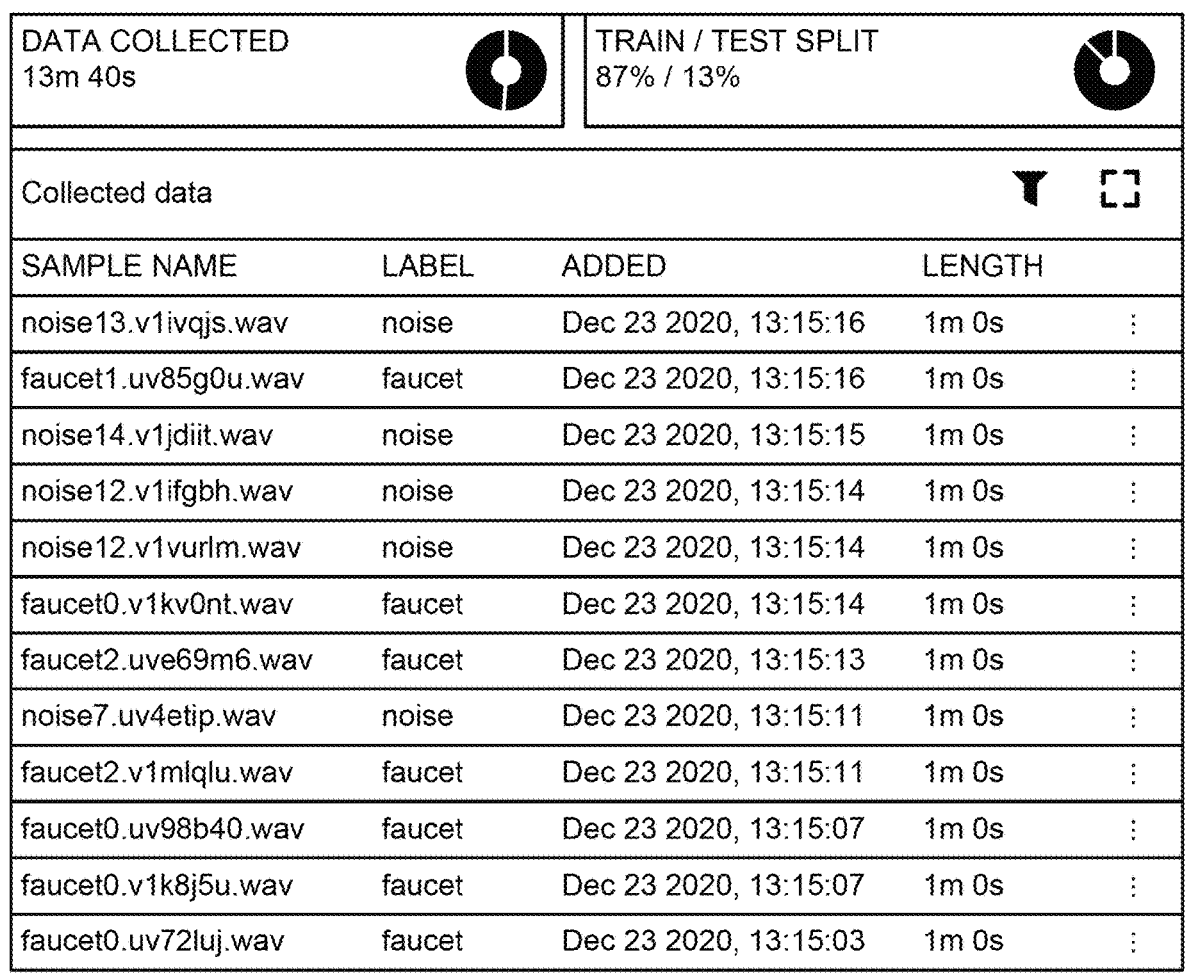
FIG. 4 is an illustration of an example of a graphical user interface (GUI) indicating data acquired from data source(s).

FIG. 4 is an illustration of an example of a GUI 400 indicating data acquired from data source(s) (e.g., the one or more data sources 330). The GUI 400 could be output for display at a user interface like the user interface 212 shown in FIG. 2. For example, the GUI 400 could be output for display to a user at the design control system 320 shown in FIG. 3. The information associated with the GUI 400 may be accessible via an API.

The GUI 400 may indicate data acquired, by the data ingestion service 312, from the one or more data sources 330 shown in FIG. 3. The data acquired (or "collected data") may comprise input data with associated labels for machine learning. For example, the collected data may include audio files that are labeled "faucet" or "noise" for training a configuration of the pipeline to classify a sound as either "faucet," indicating a sound of water running from a faucet, or "noise," indicating a sound other than water running from a faucet. The input data may be processed by the data ingestion service 312 and stored as one or more datasets in the database 324. The data ingestion service 312 may split the input data into a first amount for training the pipeline (e.g., 87%) and a second amount for testing the pipeline (e.g., 13%). In some implementations, the data ingestion service 312 may determine a default for the train/test split, and a user may change the default via the design control system 320.

Figure 5:
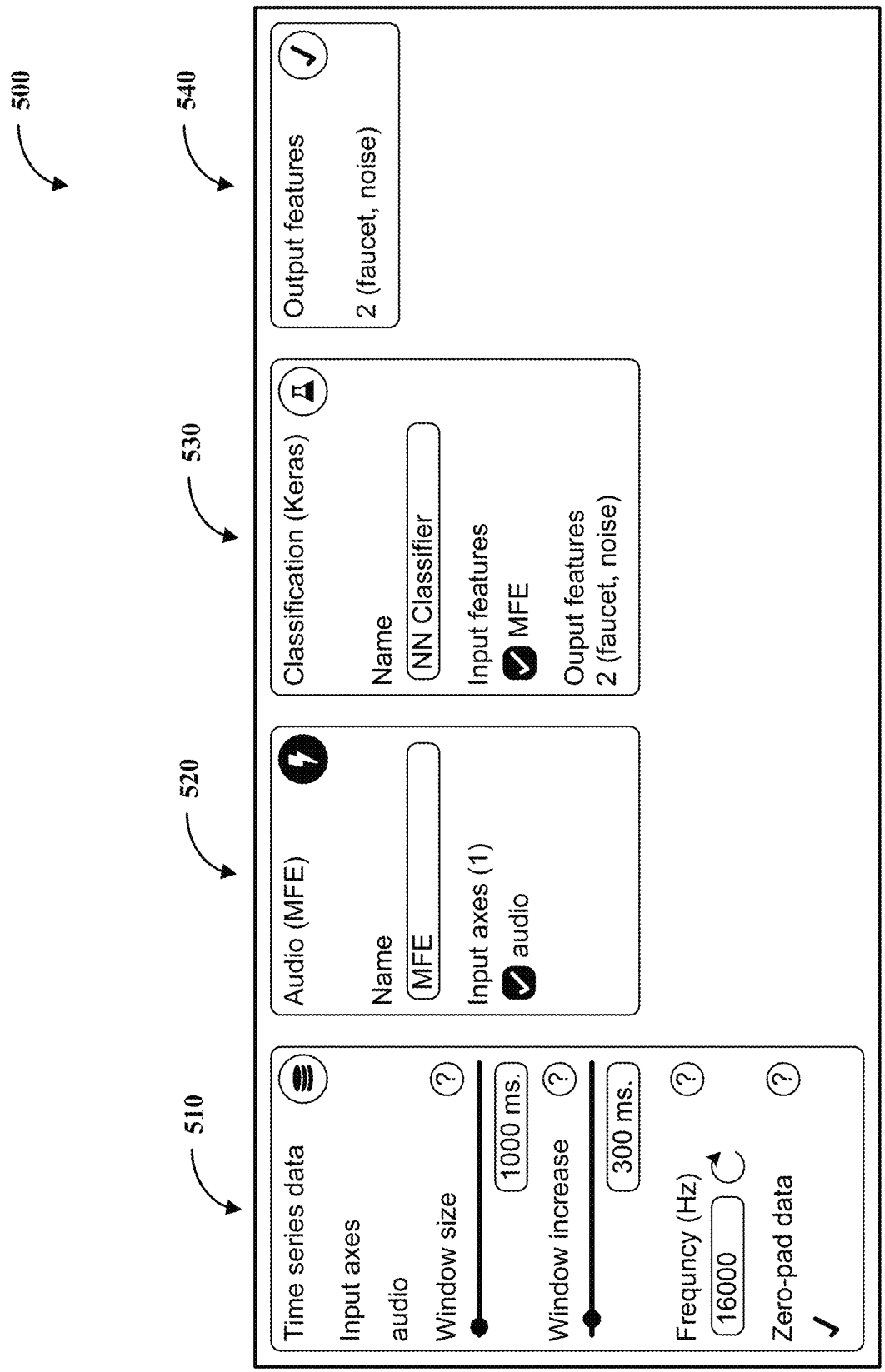
FIG. 5 is an illustration of an example of a GUI indicating configuration of a pipeline.

FIG. 5 is an illustration of an example of a GUI 500 indicating a configuration of a pipeline. The GUI 500 could be output for display at a user interface like the user interface 212 shown in FIG. 2. For example, the GUI 500 could be output for display to a user at a design control system like the design control system 320 shown in FIG. 3. The GUI 500 may be used to configure a pipeline (e.g., an impulse) for implementation on a target device (e.g., the target device 340). The information associated with the GUI 500 may be accessible via an API.

An input block 510 may indicate an input configuration, based on parameters, of the input data (e.g., images or time series, such as audio, vibration, or movements) from the one or more data sources (e.g., the one or more data sources 330). The input data may be processed by the data ingestion service 312, to produce one or more datasets, according to the input configuration (e.g., input axes for listing each axis referenced from the training dataset, window size defining the size of the raw features used for the training, window increase to extract multiple overlapping windows from a single sample, and frequency for sampling data). In some implementations, the data ingestion service 312 may determine a default for the input configuration, and the default may be modified by a user via the input block 510. A signal processing block 520 may indicate a signal processing configuration, based on parameters, for the signal processing design service 326. The signal processing configuration may be used by the signal processing design service 326 to generate the one or more signal processing components. In some implementations, the signal processing block 520 may determine a default for the signal processing configuration, and the default may be modified by a user via the signal processing block 520. A machine learning block 530 may indicate a machine learning configuration, based on parameters, for the machine learning design service 328. The machine learning configuration may be used by the machine learning design service 328 to generate the one or more machine learning components. In some implementations, the machine learning design service 328 may determine a default for the machine learning configuration, and the default may be modified by a user via the machine learning block 530. An output block 540 may indicate an output configuration, based on parameters, for the output of the pipeline (e.g., output data, such as classifying a data sample as "faucet," indicating a sound of water running from a faucet, or "noise," indicating a sound other than water running from a faucet.). In some implementations, the pipeline design service 314 may determine a default for the output configuration, and the default may be modified by a user via the output block 540.

The GUI 500 may permit one or more signal processing components (e.g., via the signal processing block 520) and the machine learning components (e.g., via the machine learning block 530) to be connected to one another in various ways (e.g., in series or in parallel). In one example, a signal processing component may be arranged in a first stage to pre-process data, followed by a machine learning component arranged in a second stage in series to process data. In another example, a first signal processing component may be arranged in a first stage to pre-process data, followed by a second signal processing component arranged in a second stage in series to further pre-process data, followed by a machine learning component arranged in a third stage in series to process data (e.g., multiple signal processing components). In another example, a signal processing component may be arranged in a first stage to pre-process data, followed by a first machine learning component arranged in a second stage in series to process data, followed by a second machine learning component arranged in a third stage in series to post-process data (e.g., multiple machine learning components). In some cases, the one or more signal processing components and/or the one or more machine learning components may be connected in parallel. For example, in a first stage, a first signal processing component may pre-process data in a first path and a second signal processing component may pre-process data in a second path, in a second stage, a first machine learning component may process data from the first signal processing component in the first path and a second machine learning component may process data from the second signal processing component in the second path, and in a third stage, a third machine learning component may post-process data from the first machine learning component and the second machine learning component in the second stage. Thus, the GUI 500 (e.g., via the pipeline design service 314) may permit one or more signal processing components and one or more machine learning components to be connected to one another in various ways.

Figure 6:
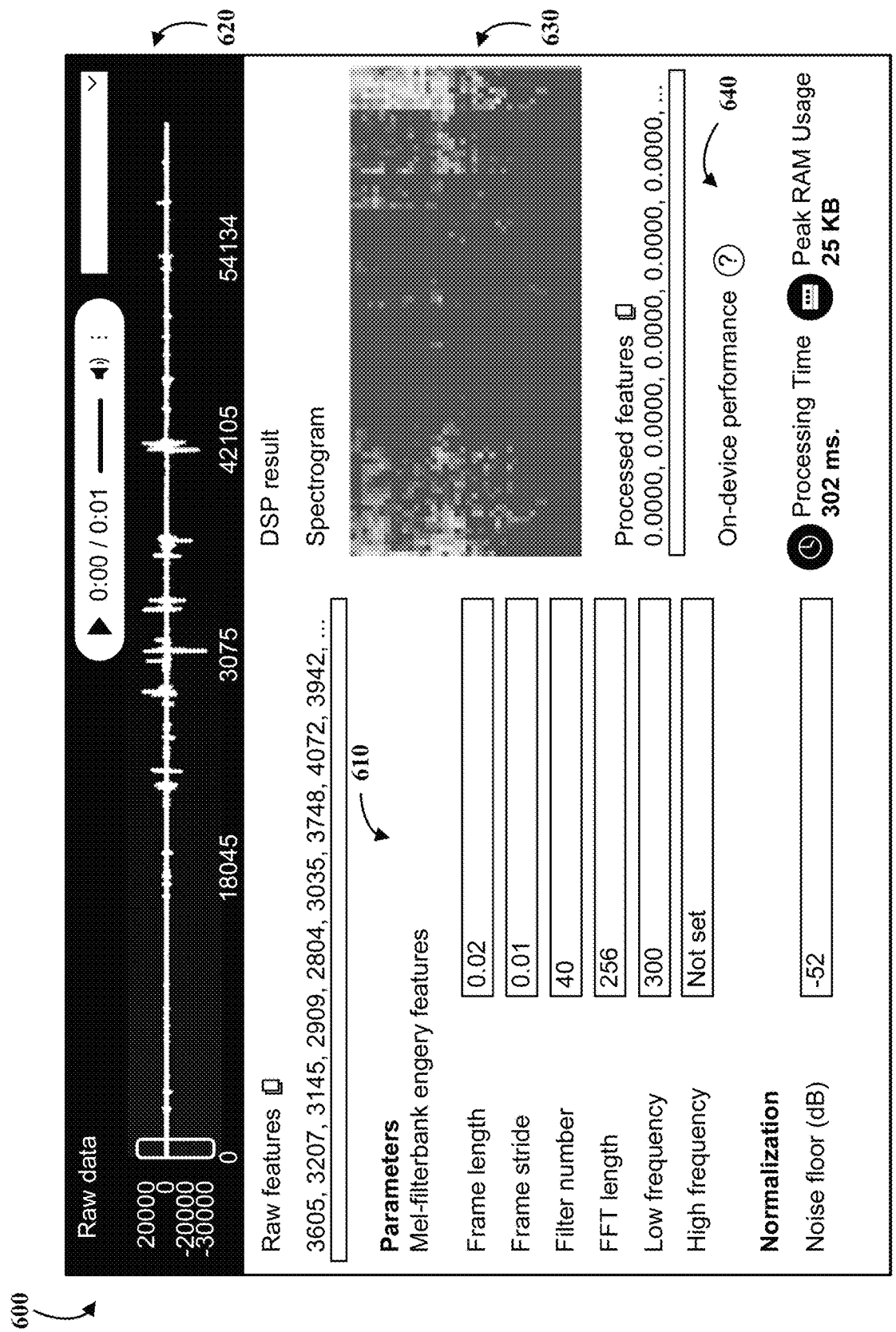
FIG. 6 is an illustration of an example of a GUI indicating configuration of a signal processing component of a pipeline.

FIG. 6 is an illustration of an example of a GUI 600 indicating a configuration, based on parameters, of a signal processing component of a pipeline. The GUI 600 could be output for display at a user interface like the user interface 212 shown in FIG. 2. For example, the GUI 600 could be output for display to a user at a design control system like the design control system 320 shown in FIG. 3. In some cases, selecting the signal processing block 520 shown in FIG. 5 may cause display of the GUI 600. The information associated with the GUI 600 may be accessible via an API.

The GUI 600 may include parameters 610 for the signal processing design service 326 to generate one or more signal processing components. The parameters 610 may permit selections of a DSP algorithm (e.g., MFE, MFCC, or spectrogram), frame length, frame stride, frequency bands, filter number, fast Fourier transform (FFT) length, low frequency, high frequency, and normalization or noise floor. The signal processing design service 326 may generate a signal processing component based on the parameters 610. A user may change one or more of the parameters 610 in the GUI 600, such as via the design control system 320.

To assist in the configuration, the GUI 600 may permit review of input data (e.g., processed by the data ingestion service 312), and features associated with the input data, via a waveform 620. The GUI 600 may also permit review of signal processing results (e.g., pre-processed data), from the signal processing component as configured, via a signal processing map 630. The GUI 600 may also indicate performance 640 (e.g., processing time and peak memory usage, such as RAM) of the signal processing component as configured. For example, the performance 640 may be determined by the signal processing design service 326, based on input (e.g., selection of the target device 340, the application constraints, the input data, and/or the one or more parameters), via simulations and/or benchmarks.

FIG. 7 is an illustration of an example of a GUI 700 indicating a configuration, based on parameters, of a machine learning component of a pipeline. The GUI 700 could be output for display at a user interface like the user interface 212 shown in FIG. 2. For example, the GUI 700 could be output for display to a user at a design control system like the design control system 320 shown in FIG. 3. In some cases, selecting the machine learning block 530 shown in FIG. 5 may cause display of the GUI 700. The information associated with the GUI 700 may be accessible via an API.

The GUI 700 may include parameters 710 for the machine learning design service 328 to generate one or more machine learning components. The parameters 710 may permit selections of a learning process (e.g., conditional logic, neural network, heuristic algorithm, or other learning algorithm, such as a classifier), and hyperparameters, such as number of training cycles, learning rate, validation set size, neural network topology, neural network size, types of layers, and order of layers. The machine learning design service 328 may generate a machine learning component based on the parameters 710. A user may change one or more of the parameters 710 in the GUI 700, such as via the design control system 320.

To assist in the configuration, the GUI 700 may permit review of machine learning results 720 (e.g., processed data), from the machine learning component as configured, such as by displaying a determined level of accuracy, a confusion matrix, and a machine learning map 730. The GUI 700 may also indicate performance 740 (e.g., inference time and peak memory usage, such as ROM and/or RAM) of the machine learning component as configured. For example, the performance 740 may be determined by the machine learning design service 328, based on input (e.g., selection of the target device 340, the application constraints, the input data, and/or the one or more parameters), via simulations and/or benchmarks.

Figure 8:
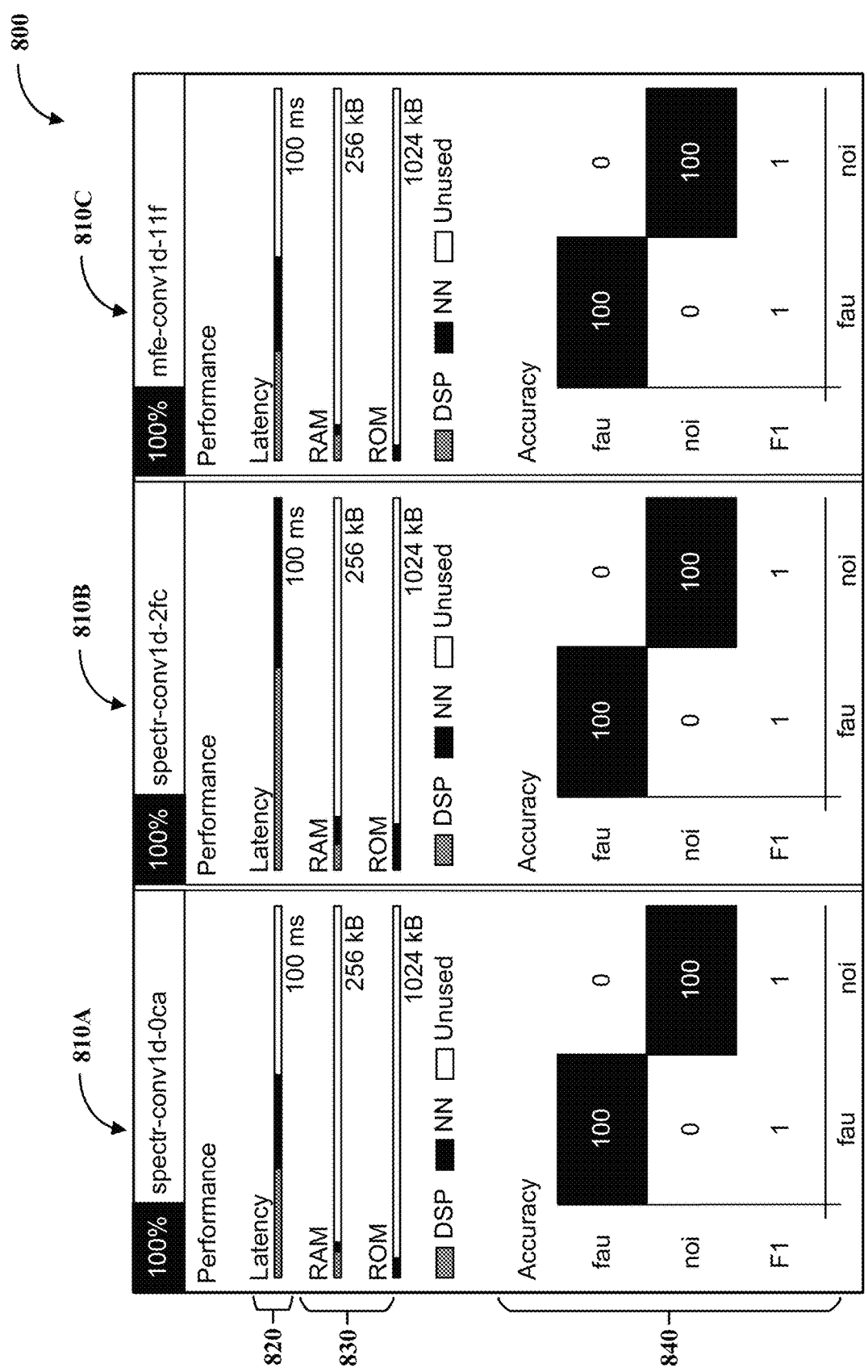
FIG. 8 is an illustration of an example of a GUI indicating performances of multiple configurations of a pipeline.

FIG. 8 is an illustration of an example of a GUI 800 indicating performances of multiple configurations of a pipeline. The GUI 800 could be output for display at a user interface like the user interface 212 shown in FIG. 2. For example, the GUI 800 could be output for display to a user at a design control system like the design control system 320 shown in FIG. 3. The information associated with the GUI 800 may be accessible via an API.

The GUI 800 may indicate performances, such as performances 810A through 810C. The performances 810A through 810C may be associated with varying configurations of the pipeline (e.g., varying based on parameters). For example, the performance 810A may be associated with a first configuration of the pipeline (e.g., a configuration of the pipeline including a signal processing component with a spectrogram algorithm and a machine learning component with a neural network having two 1D convolution layers and data augmentation); the performance 810B may be associated with a second configuration of the pipeline (e.g., a configuration of the pipeline including a signal processing component with a spectrogram algorithm and a machine learning component with a neural network having four 1D convolution layers and no data augmentation); and the performance 810C may be associated with a third configuration of the pipeline (e.g., a configuration of the pipeline including a signal processing component with an MFE algorithm and a machine learning component with a neural network having three 1D convolution layers and data augmentation). The performances 810A through 810C may be determined by the pipeline design service 314, including based on input from user (e.g., selection of the target device 340, the application constraints, the input data, and/or the one or more parameters), such as via simulation or benchmarks.

Each of the performances 810A through 810C may indicate a latency 820 (e.g., an inference time), a memory usage 830 (e.g., a RAM usage and a ROM usage), and a level of accuracy 840, for their respective configurations when implemented on the target device 340. In some implementations, the performances 810A through 810C may also indicate an energy usage when implemented on the target device 340. In some implementations, the performances 810A through 810C (e.g., the latency 820, the memory usage 830, the energy usage, or the accuracy 840) of the configurations may be determined by simulating the target device 340 implementing each of the configurations (e.g., determining the performances based on characteristics of the target device 340, such as the architecture of a device). In some implementations, the performances 810A through 810C of the configurations may be determined by referencing one or more benchmarks associated with the target device 340 (e.g., predetermined performance data from a look up table or other data structure) and applying the one or more benchmarks to estimate the performance of each configuration when implemented on the target device 340. In some cases, a machine learning model or heuristic algorithm may be used to predict the performance of a configuration based on the one or more benchmarks. This may permit determining performances more quickly when using benchmarks. In some implementations, the configurations may be ranked based on their performances (e.g., indicating a configuration with a higher level of accuracy before indicating a configuration with a lower level of accuracy). In some implementations, the performances 810A through 810C may be compared to an application constraint (e.g., a targeted latency, accuracy, memory usage, and/or energy usage) indicated by the input.

FIG. 9 is an illustration of an example of a GUI 900 indicating multiple configurations of a pipeline. The GUI 900 could be output for display at a user interface like the user interface 212 shown in FIG. 2. For example, the GUI 900 could be output for display to a user at a design control system like the design control system 320 shown in FIG. 3. The information associated with the GUI 900 may be accessible via an API.

The GUI 900 may indicate multiple configurations of a pipeline, such as configurations 910A through 910C. The configurations 910A through 910C may vary based on parameters and may be associated with varying performances of the pipeline, such the performances 810A through 810C. For example, the configuration 910A (e.g., a configuration of the pipeline including a signal processing component with a spectrogram algorithm and a machine learning component with a neural network having two 1D convolution layers and data augmentation) may be associated with the performance 810A; the configuration 910B (e.g., a configuration of the pipeline including a signal processing component with a spectrogram algorithm and a machine learning component with a neural network having four 1D convolution layers and no data augmentation) may be associated with the performance 810B; and the configuration 910C (e.g., a configuration of the pipeline including a signal processing component with an MFE algorithm and a machine learning component with a neural network having three 1D convolution layers and data augmentation) may be associated with the performance 810C. The configurations 910A through 910C may be determined by the pipeline design service 314, including based on input from a user (e.g., selection of the target device 340, the application constraints, the input data, and/or the one or more parameters). For example, the configurations 910A through 910C may be determined by the signal processing design service 326 and the machine learning design service 328. In some implementations, the GUI 900 and the GUI 800 may be displayed in a combined GUI that indicates the relationships between the performances 810A through 810C and, correspondingly, the configurations 910A through 910C.

Each of the configurations 910A through 910C may include indication of an input configuration 920, a signal processing configuration 930, and a machine learning configuration 940. The input configuration 920 may be based on parameters for the input data used by the data ingestion service 312. The signal processing configuration 930 may be based on parameters for the signal processing component used by the signal processing design service 326. The machine learning configuration 940 may be based on parameters for the machine learning component used by the machine learning design service 328.

Figure 10:
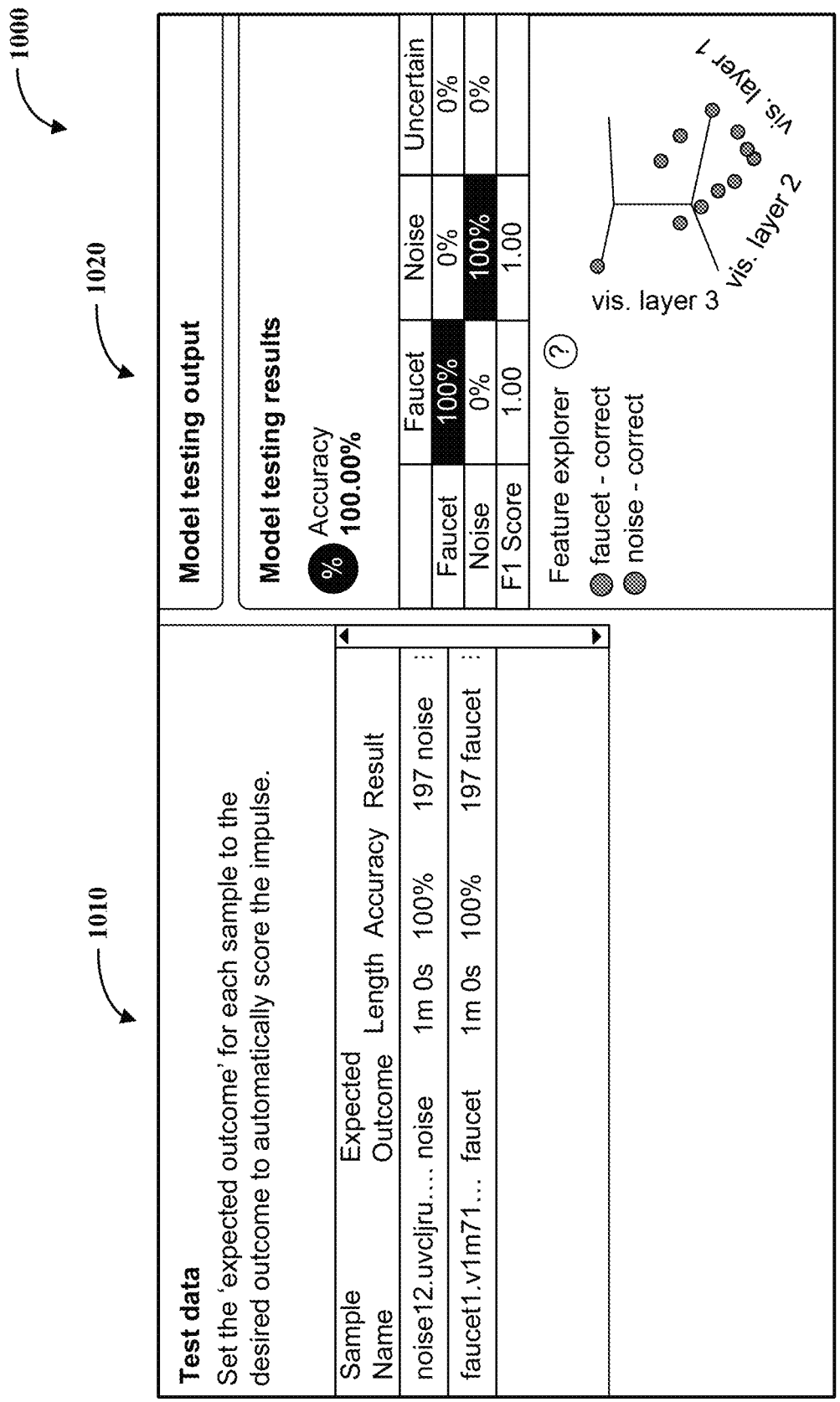
FIG. 10 is an illustration of an example of a GUI indicating testing of a configuration of a pipeline.

FIG. 10 is an illustration of an example of a GUI 1000 indicating testing of a configuration of a pipeline. The GUI 1000 could be output for display at a user interface like the user interface 212 shown in FIG. 2. For example, the GUI 1000 could be output for display to a user at a design control system like the design control system 320 shown in FIG. 3. The information associated with the GUI 800 may be accessible via an API.

The GUI 1000 may indicate test data 1010 used by the test service 316 for a configuration of the pipeline. For example, the test service 316 may use data from datasets stored in the database 324 to test the or more configurations of the pipeline. In one example, the test service 316 may test the one or more configurations of the pipeline with respect to a level of accuracy of predictions. The test service 316 may provide a testing output 1020 to a user, via the design control system 320, so that the user may accept or change a configuration of the pipeline based on the testing. The testing output 1020 may include, for example, a determined level of accuracy and a machine learning map. For example, the testing output 1020 may indicate the test service 316 has determined a level of accuracy of 100% for predictions based on the test data (e.g., classifying a data sample as "faucet," indicating a sound of water running from a faucet, or "noise," indicating a sound other than water running from a faucet.).

Figure 11:
FIG. 11 is an illustration of an example of a GUI indicating deployment of a configuration of a pipeline to a library.

FIG. 11 is an illustration of an example of a GUI 1100 indicating deployment of a configuration of a pipeline to a library. A computer or other device (e.g., the target device 340) may use the library to implement a configuration of the pipeline. The GUI 1100 could be output for display at a user interface like the user interface 212 shown in FIG. 2. For example, the GUI 1100 could be output for display to a user at a design control system like the design control system 320 shown in FIG. 3. The information associated with the GUI 1100 may be accessible via an API.

The GUI 1100 may indicate multiple possible targets that are libraries. For example, possible libraries could include: a C++ library, Arduino library, Cube.MX CMSIS-PACK, WebAssembly, TensorRT library, Ethos-U library, and Simplicity Studio Component. A user may provide input (e.g., via the design control system 320) to select a library as a target. The deployment service 318 may receive the input and may utilize a software toolchain, specific to the library that is selected, for generating software for deploying a configuration of the pipeline to the library. For example, the deployment service 318 may include a compiler for generating compiled code targeting the library that is selected. A computer or other device (e.g., the target device 340) may use the library to implement a configuration of the pipeline.

Figure 12:
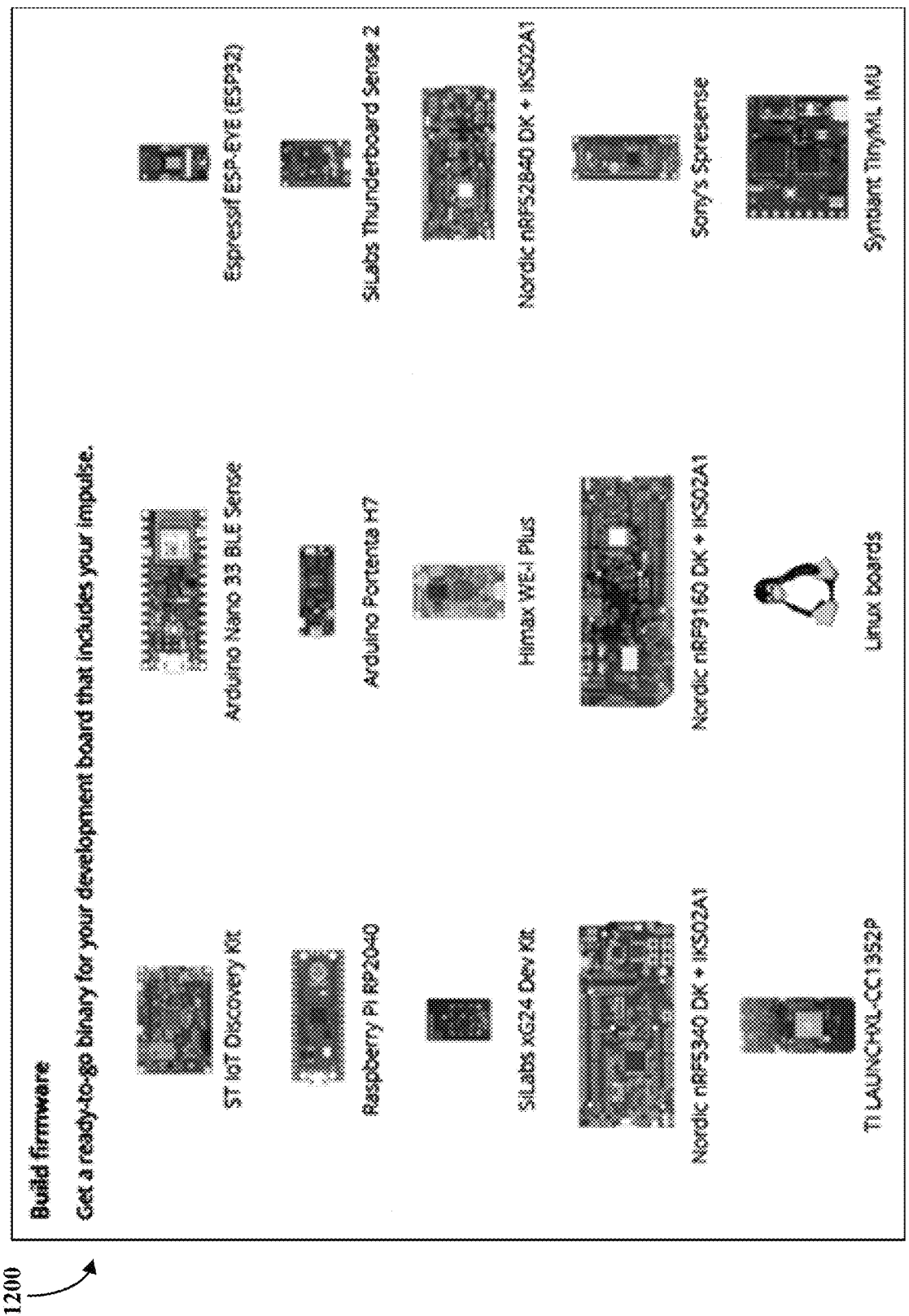
FIG. 12 is an illustration of an example of a GUI indicating deployment of a configuration of a pipeline to a device.

FIG. 12 is an illustration of an example of a GUI 1200 indicating deployment of a configuration of a pipeline to a device (e.g., the target device 340). The GUI 1200 could be output for display at a user interface like the user interface 212 shown in FIG. 2. For example, the GUI 1200 could be output for display to a user at a design control system like the design control system 320 shown in FIG. 3. The information associated with the GUI 1200 may be accessible via an API.

The GUI 1200 may indicate multiple possible target devices comprising microcontrollers or boards in a library. For example, possible target devices in the library could include: an ST IoT Discovery Kit, Arduino Nano 33 BLE Sense, Espressif ESP-EYE (SEP32), Raspberry Pi RP2040, Arduino Portenta H7, SiLabs Thunderboard Sense 2, SiLabs xG24 Dev Kit, Himax WE-I Plus, Nordic nRF52840 DK+IKS02A1, Nordic nRF5340 DK+IKS02A1, Nordic nRF9160 DK+IKS02A1, Nordic Thingy:53, Sony's Spresense, TI LAUNCHXL-CC1352P, and Linux Boards. A user may provide input (e.g., via the design control system 320) to select a microcontroller or board as a target device (e.g., the target device 340). The deployment service 318 may receive the input and may utilize a software toolchain, specific to the microcontroller or board that is selected, for generating software and/or firmware for deploying a configuration of the pipeline to the microcontroller or board. For example, the deployment service 318 may include a compiler for generating compiled code targeting the microcontroller or board that is selected, including software and/or firmware. In some implementations, the deployment service 318 may communicate with a programming system (e.g., the programming system 132) to send the software and/or firmware to a programming system for programming the microcontroller or board (e.g., programming a flash memory or ROM of the microcontroller).

FIG. 13 is an illustration of an example of a GUI 1300 indicating deployment of a configuration of a pipeline to a computer or a mobile phone (e.g., the target device 340). The GUI 1300 could be output for display at a user interface like the user interface 212 shown in FIG. 2. For example, the GUI 1300 could be output for display to a user at a design control system like the design control system 320 shown in FIG. 3. The information associated with the GUI 1300 may be accessible via an API.

The GUI 1300 may indicate multiple possible target devices comprising computers or mobile phones in a library. A user may provide input (e.g., via the design control system 320) to select a computer or a mobile phone as a target device (e.g., the target device 340). The deployment service 318 may receive the input and may utilize a software toolchain, specific to the computer or the mobile phone that is selected, for generating software for deploying a configuration of the pipeline to the computer or the mobile phone. For example, the deployment service 318 may include a compiler for generating compiled code targeting the computer or the mobile phone that is selected. In some implementations, the deployment service 318 may communicate with the computer or the mobile phone (e.g., via the network 102) to send the software and/or firmware to the computer or the mobile phone, for the computer or the mobile phone to execute, for implementing the pipeline.

Figure 14:
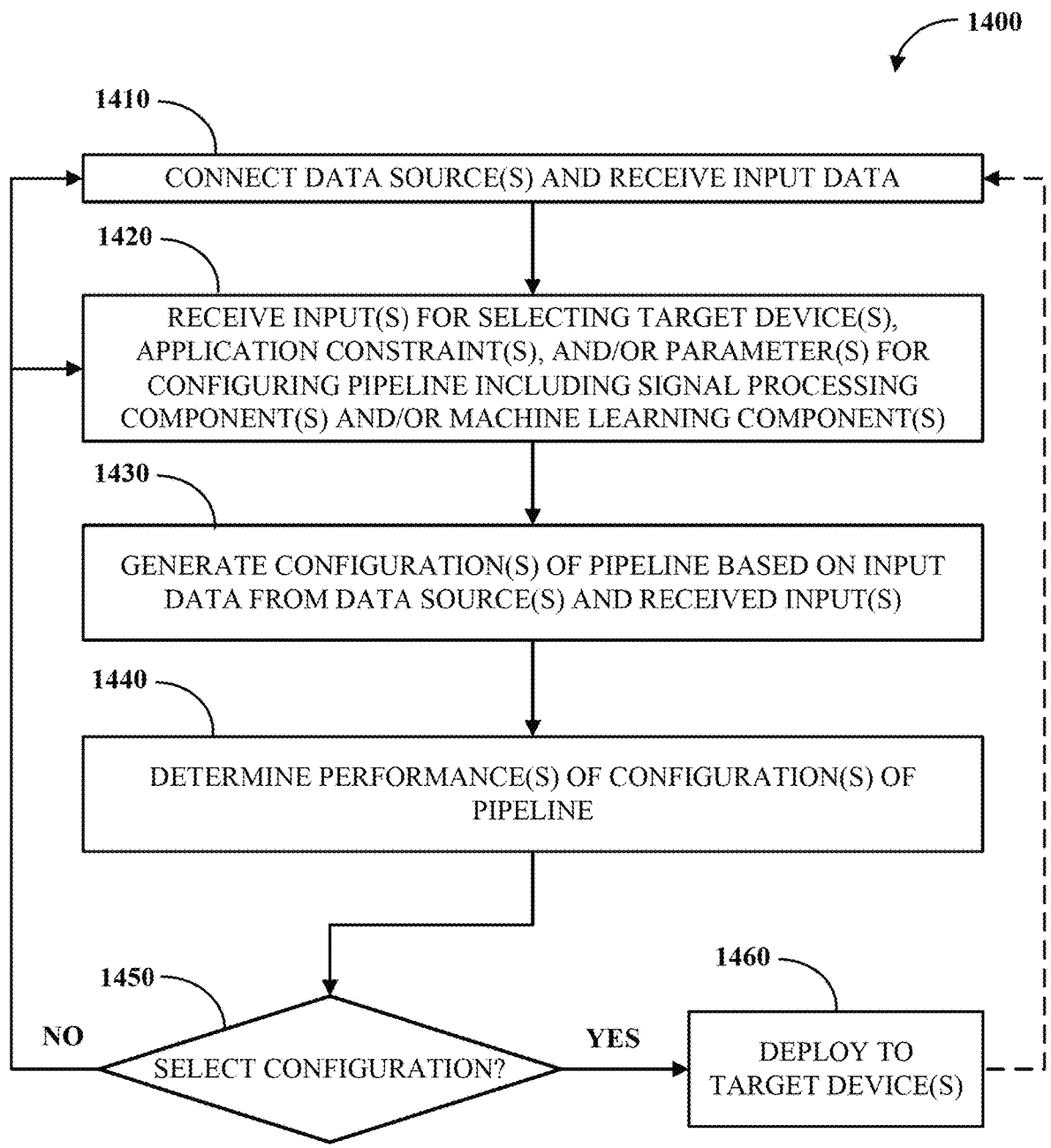
FIG. 14 is a flow chart of an example of a process for configuring a pipeline including a signal processing component and a machine learning component.

To further describe some implementations in greater detail, reference is next made to examples of techniques which may be performed when configuring a pipeline that includes a signal processing component and a machine learning component. FIG. 14 is a flow chart of an example of a technique 1400 for configuring a pipeline that includes a signal processing component and a machine learning component. The technique 1400 can be executed using computing devices, such as the systems, hardware, and software described with respect to FIGS. 1-13. The technique 1400 can be performed, for example, by executing a machine-readable program or other computer-executable instructions, such as routines, instructions, programs, or other code. The steps, or operations, of the technique 1400 or another technique, method, process, or algorithm described in connection with the implementations disclosed herein can be implemented directly in hardware, firmware, software executed by hardware, circuitry, or a combination thereof.

For simplicity of explanation, the technique 1400 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1410, a configuration service (e.g., the configuration service 310) may connect to one or more data sources (e.g., the one or more data sources 330). The configuration service may receive input data, from the one or more data sources, via a data ingestion service (e.g., data ingestion service 312). The data ingestion service that process the input data to generate one or more datasets that may be used to configure, train, and/or test a configuration of the pipeline. The input data may be processed according to a configuration, based on parameters, such as input axes for listing each axis referenced from the training dataset, window size defining the size of the raw features used for the training, window increase to extract multiple overlapping windows from a single sample, and frequency for sampling data. The one or more datasets may be stored by the configuration service in a database (e.g., the database 324). The one or more data sources could be selected and/or configured by a user via a design control system (e.g., the design control system 320). The one or more data sources could also be configured by the configuration service, such as for transferring the input data from the one or more data sources to the configuration service. The one or more data sources may include, for example, one or more servers, computers, mobile phones, or other electronic devices, such as microcontrollers or boards.

At 1420, the configuration service may receive one or more inputs, such as from a user via the design control system. The one or more inputs may include selection of a target device (e.g., the target device 340) from multiple possible target devices, including a microcontroller or board, a computer, or a mobile phone. The one or more inputs may also include an indication of one or more application constraints (e.g., a targeted latency, accuracy, memory usage, and/or energy usage). The one or more inputs may also include input data. The one or more inputs may also include an indication of one or more parameters, and/or a modification of one or more parameters determined by the configuration service, for configuring a pipeline that includes a signal processing component and a machine learning component. For example, the one or more parameters may be used to configure a signal processing component (e.g., settings that affect signal processing calculations, such as a particular DSP algorithm or noise floor) and/or a machine learning component (e.g., settings that affect machine learning, such as hyperparameters including neural network topology, size, or training) of the pipeline.

At 1430, the configuration service may generate multiple configurations of a pipeline based on the one or more inputs (e.g., the target device, the application constraints, the input data, and/or the one or more parameters). For example, a pipeline design service (e.g., the pipeline design service 314) of the configuration service may invoke a signal processing design service (e.g., the signal processing design service 326) and a machine learning design service (e.g., the machine learning design service 328) to generate the multiple configurations of the pipeline. For example, the configuration service may generate multiple configurations like the configurations 910A through 910C shown in FIG. 9.

At 1440, the configuration service may determine the performances of the multiple configurations of the pipeline. For example, the configuration service may determine the performances of the multiple configurations like the performances 810A through 810C shown in FIG. 8. In some implementations, the performance (e.g., the latency, the memory usage, the energy usage, or the accuracy) of a configuration may be determined by simulating the target device implementing the configuration (e.g., determining the performance based on characteristics of the target device, such as the architecture of a microcontroller or board, a computer, or a mobile phone. In some implementations, the performance of a configuration may be determined by referencing one or more benchmarks associated with the target device (e.g., predetermined performance data from a look up table or other data structure) and applying the one or more benchmarks to estimate the performance of the configuration when the target device implements the configuration. In some cases, a machine learning model or heuristic algorithm may be used to predict the performance of the configuration based on the one or more benchmarks. This may permit determining the performance more quickly when using benchmarks. In some implementations, the configurations may be ranked based on their performances. In some implementations, the performance of a configuration may be compared to an application constraint (e.g., a targeted latency, accuracy, memory usage, and/or energy usage) indicated by an input.

At 1450, the configuration service may determine whether a configuration of the multiple configurations is selected. A configuration may be selected, for example, by a user providing input via the design control system. In some implementations, a configuration may be automatically selected, such as when a configuration is determined to satisfy the application constraint. For example, a configuration may be automatically selected based on a rank of the configuration (e.g., a highest ranking accuracy and/or inference time, while satisfying the targeted memory usage and/or energy usage). If a configuration is not selected ("No"), the technique may repeat, such as by returning to 1410 (e.g., to connect another data source and/or receive additional input data) or 1420 (e.g., to receive additional inputs, or changes to inputs). If a configuration is selected ("Yes"), the technique may continue at 1460 in which the configuration may be deployed to the target device. In some implementations, the configuration may be implemented on a target device by utilizing a software toolchain for the target device, such as for generating firmware. In some implementations, implementing the configuration on a target device may include determining portions of the pipeline to be implemented on various cores of a heterogenous device, and distributing a computational workload associated with the pipeline across the various cores. In some implementations, the target device may be implemented in a field system (e.g., the field system 150), and in some cases, the target device may be used to provide input data to the configuration service as a data source, such as for testing the target device when it is implemented and/or implementing a next target device (e.g., a second target device).

As a result, a pipeline including one or more signal processing components and one or more machine learning components may be determined for an application and/or a device while reducing the time and/or the burden associated with making the determination. Further, the pipeline may be implemented on a target device while reducing the time and/or the burden associated with utilizing the software toolchain for the target device. Additionally, by determining configurations that include signal processing and machine learning components, trade-offs between signal processing efficiency (e.g., utilization of the signal processing component) and machine learning efficiency (e.g., utilization of the machine learning component) may be achieved.

Figure 15:
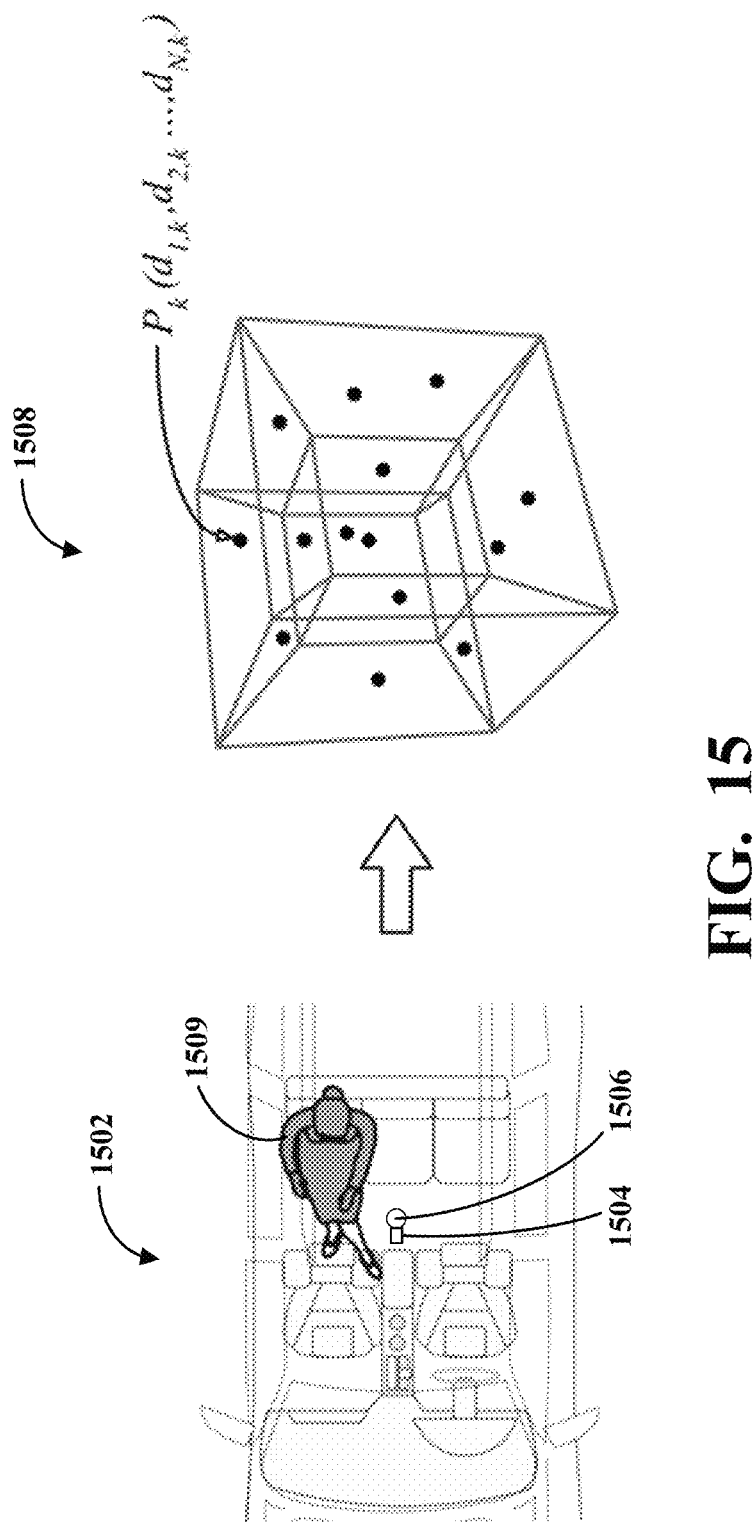
FIG. 15 is an illustration of an example of sensing in an environment to generate a point cloud.

In some cases, it may be desirable for the device to make predictions from point cloud data. FIG. 15 is an illustration of an example of sensing in an environment 1502 to generate a point cloud 1508. By way of example, the environment 1502 could include a vehicle including multiple seats. A sensing system 1504, which may be implemented by an embedded device such as a microcontroller, may be present in the environment 1502. The sensing system 1504 may be connected to a sensor 1506 arranged in the environment 1502, such as on a ceiling of the interior space of the vehicle. The sensor 1506 could be a millimeter wave sensor configured to sense objects in the environment 1502 by emitting radiofrequency (RF) waves (e.g., wavelengths from one to ten to millimeters) and sensing reflections from the waves corresponding to surfaces in the environment 1502 (e.g., multiple points). For example, the sensor 1506 may be used to sense persons or objects in the vehicle, such as persons or objects in particular seats. For example, the sensor 1506 may sense a person 1509 in second row, right side seat, which may correspond to a particular seat number (e.g., seat five). The sensor 1506 may generate a point cloud 1508 based on the sensing. The point cloud 1508 may include multiple (e.g., a variable length given by "k") data points (e.g., "P"). The point cloud 1508 could correspond to a scan frame generated by the sensor 1506 at a particular time. The sensor 1506 may generate multiple scan frames over a period of time for the sensing system 1504, such as when a predetermined event occurs (e.g., detecting doors opening and closing in the environment 1502, or the vehicle starting and stopping) or at predetermined time intervals (e.g., once per minute).

In the point cloud 1508, the data points may be in three dimensions given by spatial coordinates. For example, the three dimensions could include a radius, an azimuth, and a height (or elevation) in cylindrical coordinates, a radius, a polar angle, and an azimuthal angle in spherical coordinates. The data points may be associated with N values (e.g., dimensions, given by "d") where N is an integer of three more. For example, a data point may be associated with a first value ("$d_{1,k}$") corresponding to a first spatial coordinate, such as azimuth or polar angle; a second value ("$d_{2,k}$") corresponding to a second spatial coordinate, such as height or azimuthal angle; and a third value ("$d_{3,k}$") corresponding to a third spatial coordinate, such as radius (or range). In some implementations, a data point may be associated with more than three values. For example, a data point could be associated with a fourth value ("$d_{4,k}$") corresponding to SNR (e.g., indicating a quality of the particular measurement), and a fifth value ("$d_{5,k}$") corresponding to time (e.g., indicating a timing of the data point measurement and/or the scan frame relative to other measurements). Thus, data points of the point cloud 1508 may be expressed by a function given by $P_K(d_{1,k}, d_{2,k} \ldots d_{N,k})$. The sensing system 1504 may receive the point cloud 1508, including the data points associated with the values.

Figure 16:
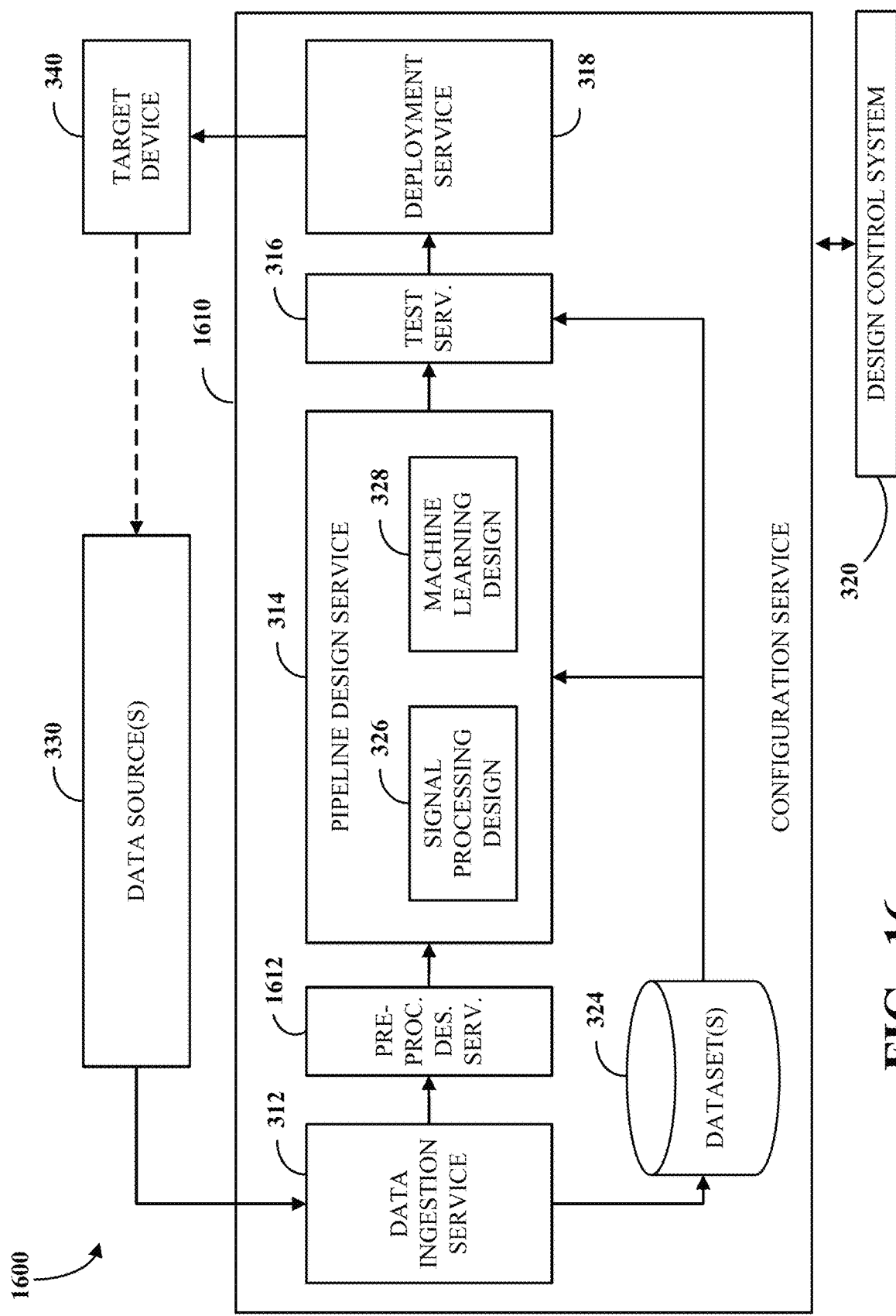
FIG. 16 is a block diagram of an example of another system for configuring a pipeline including a signal processing component and a machine learning component.

A configuration service may be used to configure a sensing system, such as the sensing system 1504. FIG. 16 is a block diagram of an example of a system 1600 for configuring a pipeline including a signal processing component and a machine learning component. The system 1600 may include a configuration service 1610 that includes the data ingestion service 312, the pipeline design service 314 (including the signal processing design service 326 and the machine learning design service 328), the test service 316, the deployment service 318, and the database 324 as described in FIG. 3. The configuration service 1610 may also include a pre-processing design service 1612 (e.g., a point cloud configuration service). The system 1600 may also include the design control system 320, the one or more data sources 330, and the target device 340, as described in FIG. 3.

The pre-processing design service 1612 may be arranged between the data ingestion service 312 and the pipeline design service 314. The pre-processing design service 1612 may be used to configure a sensing system (e.g., the sensing system 1504) for an embedded device to pre-process point cloud data (e.g., the point cloud 1508). The pre-processing design service 1612 may configure the sensing system to generate an image from a point cloud. Generating the image may include mapping first and second values of data points to first and second coordinates of pixels of an image and mapping third values of data points to intensities of the pixels (e.g., brightness of a pixel for a monochrome image, or color channels for an RGB image).

The pipeline design service 314 can generate a configuration of a pipeline, including a DSP component generated by the signal processing design service 326, and a machine learning component generated by the machine learning design service 328 (with input from the pre-processing design service 1612). The pipeline may be implemented on the target device 340, which could be a specified microcontroller, board, computer, or mobile phone. The machine learning component may include a machine learning model that the sensing system (e.g., the sensing system 1504) can invoke to process the image. The machine learning model may be trained by the machine learning design service 328 for image processing. In some implementations, the machine learning model may can enable processing video as a sequence of images. Thus, an unordered, variable size point cloud may be translated into a fixed size, normalized image that aggregates data in a consistent manner, which can be conveniently processed with the machine learning model configured for image processing The pre-processing design service 1612 may determine parameters for configuring the sensing system (e.g., the sensing system 1504). For example, the parameters may include a targeted size of the image and targeted intensities of the pixels. The targeted size of the image may include a number of pixels of the image (e.g., an image of 8×8 pixels, or 256×256 pixels). The targeted intensities of the pixels could include a number of colors per pixel (e.g., one color for monochrome, or three colors for RGB) and a color depth per pixel (e.g., 8 bits per pixel, or 256 bits per pixel). The pre-processing design service 1612 may determine the parameters based on the target device and/or samples of point cloud data from the data ingestion service 312. For example, the pre-processing design service 1612 may receive an input indicating the target device 340 (e.g., an embedded device, such as a microcontroller). The target device 340 may have constraints, such as a maximum latency, accuracy, memory usage, and/or energy usage. The pre-processing design service 1612 may determine the parameters based on the constraints.

In another example, the pre-processing design service 1612 may receive input from the data ingestion service 312, such as labeled samples of point cloud data (e.g., different scan frames). The samples may be representative of a targeted environment for the application. For example, to target an application like the environment 1502, the pre-processing design service 1612 could receive a first point cloud corresponding to the person 1509 in seat five (e.g., the point cloud 1508, which could be labeled "seat5.full"), and a second point cloud corresponding to no persons or objects in the vehicle (which could be labeled "empty"). The pre-processing design service 1612 may use the samples to determine the parameters so that the sensing system (e.g., the sensing system 1504) is optimized when deployed in the environment 1502. For example, the pre-processing design service 1612 may determine a size of the image, including a number of pixels and/or intensities, based on a size of the point cloud (e.g., the point cloud 1508), including a number of data points of the point cloud (e.g., the variable length given by k) and a number of values per data point (e.g., the variable length N).

As a result, the pre-processing design service 1612 may configure a sensing system (e.g., the sensing system 1504) to transform three dimensional data points of a point cloud (e.g., the point cloud 1508) into a two dimensional digital image to enable a machine learning model to process the data as an image. For example, the machine learning model, configured by the machine learning design service 328, may invoke computer vision processing, such as object classification and/or object detection. The pre-processing design service 1612 may configure the sensing system to be implemented by an embedded device. The embedded device may be deployed in an environment, such as the environment 1502. The sensing system can then receive a point cloud (e.g., the point cloud 1508) from a sensor, such as the sensor 1506. The point cloud may include data points in three dimensions and may be associated with at least three values (e.g., spatial coordinates, SNR, and time relative to other frames). The sensing system can then generate an image from the point cloud by mapping first and second values of data points (e.g., azimuth and height) to first and second coordinates of pixels of the image (e.g., locations of pixels of the image, which may be given by X and Y coordinates in a Cartesian coordinate system) and third values of data points (e.g., range) to intensities of the pixels (e.g., brightness of a pixel for a monochrome image, or color channels for an RGB image).

Figure 17:
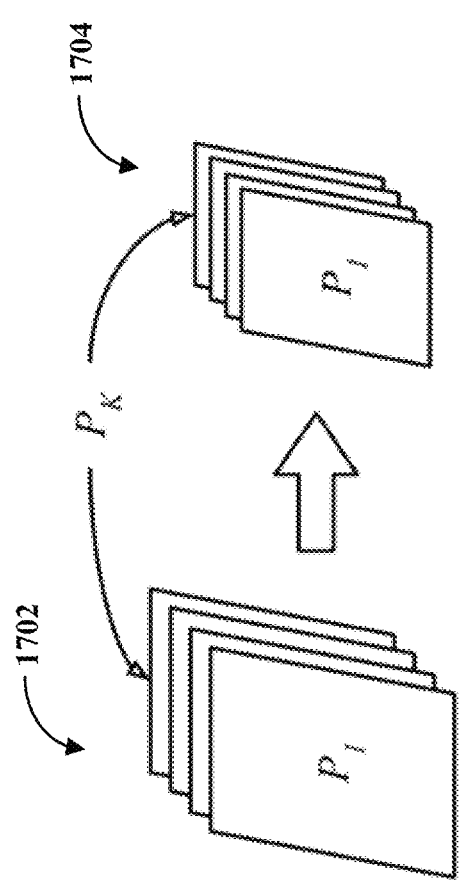
FIG. 17 is a block diagram of normalizing values of a point cloud.

With additional reference to FIG. 17, the pre-processing design service 1612 may configure the sensing system (e.g., the sensing system 1504) to normalize the values of variable-length, N-dimensional data points 1702 of a point cloud into a normalized values of data points 1704. For example, based on the determined size of a target image (e.g., 8×8 pixels, with an intensity given by 8 bits per pixel), when the third value is mapped to the intensity, multiple intensity values may result for a single pixel coordinate location (e.g., X, and Y). These multiple values may be added together, and to reduce saturation of a resulting intensity values, a scaling factor (e.g., a "normalization" factor) may be applied to each value of intensity. The pre-processing design service 1612 may determine the normalization factor for a given image size by mapping data in a training dataset to an unconstrained dimension (not limited by a maximum value) and dividing the upper limit of a determined intensity (e.g., 255 for the image having 8 bits per pixel) by a maximum sum of overlapping values in the unconstrained dimension. The normalization factor may enable values to be added without saturation when they overlap once quantized in the pixel coordinate locations (e.g., X, and Y) of the image. The normalized values of the data points 1704 may then be used to generate the image.

Figure 18:
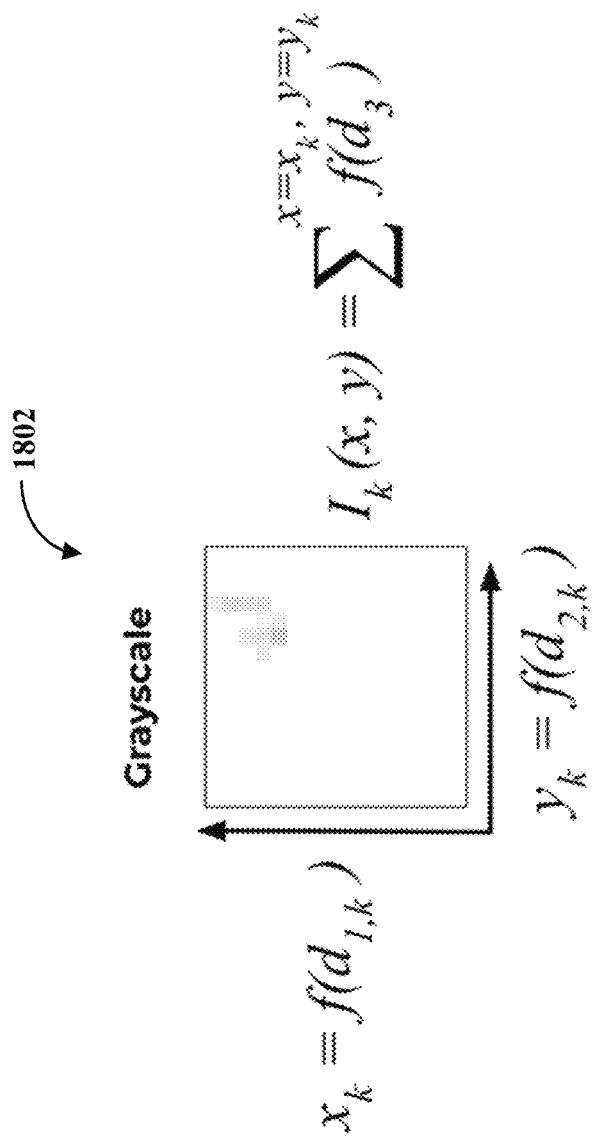
FIG. 18 is a block diagram of an example of generating an image from data points associated with three values.

With additional reference to FIG. 18, the pre-processing design service 1612 may configure the sensing system (e.g., the sensing system 1504) to generate the image 1802 from data points associated with three values. The image 1802 may be generated by mapping: first values of data points (e.g., azimuth or polar angle) to first coordinates of pixels (e.g., locations of pixels referenced by the X-axis of the image, such as in a range from 1 to 8 pixels in rows), which may be expressed by a function given by $X_k=f\Sigma(d_{1,k})$; second values of data points (e.g., height or azimuthal angle) to second coordinates of pixels (e.g., locations of pixels referenced by the Y-axis of the image, such as in a range from 1 to 8 pixels), which may be expressed by a function given by $Y_k=f\Sigma(d_{2,k})$; and third values of data points (e.g., radius) to intensities ("I") of the pixels (e.g., brightness of a pixel, such as in a range from 1 to 8 pixels in columns), which may be expressed by a function given by $I_k(x,y)=\Sigma^{x=xk,y=yk}f(d_3)$. The mapping may be performed by quantizing the first and second values into ranges of the first and second coordinates and quantizing the third values into a range of the intensities. Based on the data points being associated with only three values, the image could be constructed as a grayscale or monochrome image. This may simplify processing by the machine learning model. The image 1802 may then be processed by a machine learning model trained to process monochrome images (e.g., trained for object classification or object detection in monochrome images).

In some implementations, the pre-processing design service 1612 may determine the radius or range to be the third values of data points corresponding to the intensities of the pixels. The first and second values of data points, such as other spatial coordinates in a three dimensional coordinate system, may correspond to the to the X-axis and Y-axis of the image. This may enable the image to visually result in a heat map when displayed by a GUI for a user. While values of data points can be used to construct images in other ways, corresponding the radius to the intensities may enable an improved visual analysis.

Figure 19:
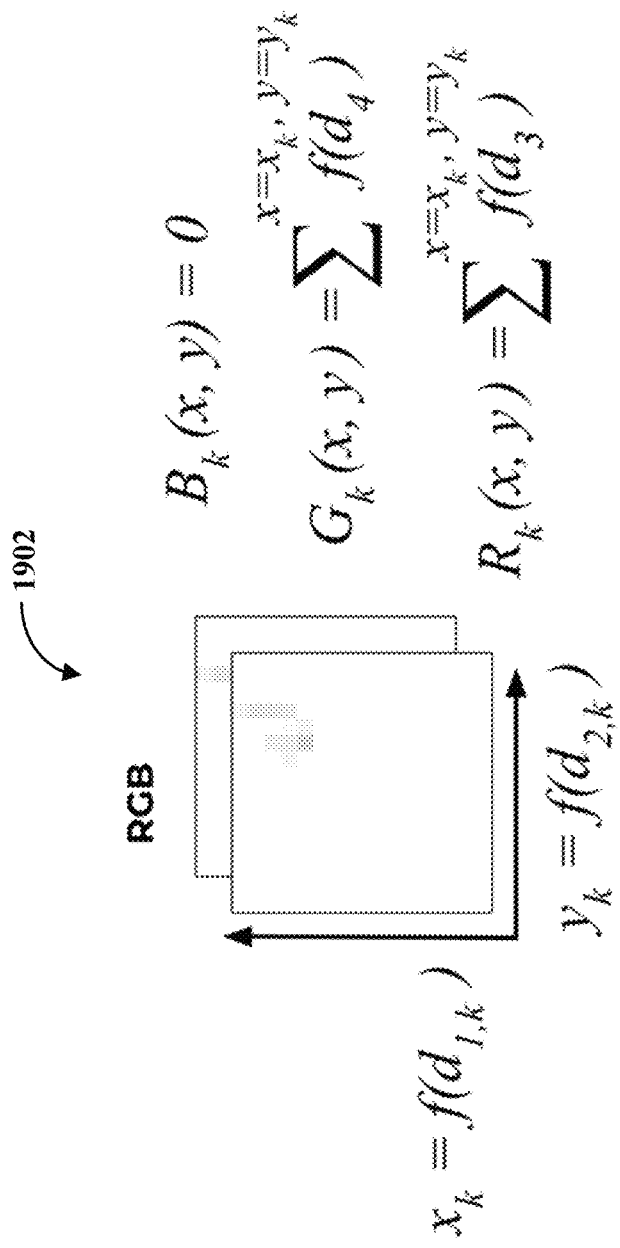
FIG. 19 is a block diagram of an example of generating an image from data points associated with four values.

With additional reference to FIG. 19, the pre-processing design service 1612 may configure the sensing system (e.g., the sensing system 1504) to generate the image 1902 from data points associated with four values. Based on the data points being associated with four values, the image could be constructed as an RGB image. The image 1902 may be generated by mapping: first values of data points (e.g., azimuth or polar angle) to first coordinates of pixels (e.g., locations of pixels referenced by the X-axis of the image, such as in a range from 1 to 8 pixels in rows), which may be expressed by a function given by $X_k=f\Sigma(d_{1,k})$; second values of data points (e.g., height or azimuthal angle) to second coordinates of pixels (e.g., locations of pixels referenced by the Y-axis of the image, such as in a range from 1 to 8 row of pixels in columns), which may be expressed by a function given by $Y_k=f\Sigma(d_{2,k})$; third values of data points (e.g., radius) to intensities of a first color ("R") of the pixels (e.g., brightness of Red in a pixel, such as in a range from 1 to 8 pixels), which may be expressed by a function given by $R_k(x, y)=\Sigma^{x=xk,y=yk} f(d_3)$; and fourth values of data points (e.g., SNR) to intensities of a second color ("G") of the pixels (e.g., brightness of Green in a pixel, such as in a range from 1 to 8 pixels), which may be expressed by a function given by $G_k(x, y)=\Sigma^{x=xk,y=yk} f(d_4)$. The mapping may be performed by quantizing the first and second values into ranges of the first and second coordinates, quantizing the third values into a range of intensities of the first color of the pixels (Red), and quantizing the fourth values into a range of intensities of the second color of the pixels (Green). Intensities of a third color of the pixels (e.g., brightness of Blue in a pixel, such as in a range from 1 to 8 pixels), can default to zero (e.g., Black, or no color present) to reduce its affect in the image 1902. The image 1902 may then be processed by a machine learning model trained to process RGB images (e.g., trained for object classification or object detection in color images).

In some implementations, the pre-processing design service 1612 may configure the sensing system (e.g., the sensing system 1504) to map the third values of data points (e.g., radius) to a first color (e.g., 8 bits of Red) and a first portion of a second color (e.g., lower 4 bits of Green) of the pixels and map fourth values of data points (e.g., SNR) to a second portion of the second color (e.g., upper 4 bits of Green) and a third color of the pixels (e.g., 8 bits of Blue). This may enable the values of data points to be processed with greater precision.

Figure 20:
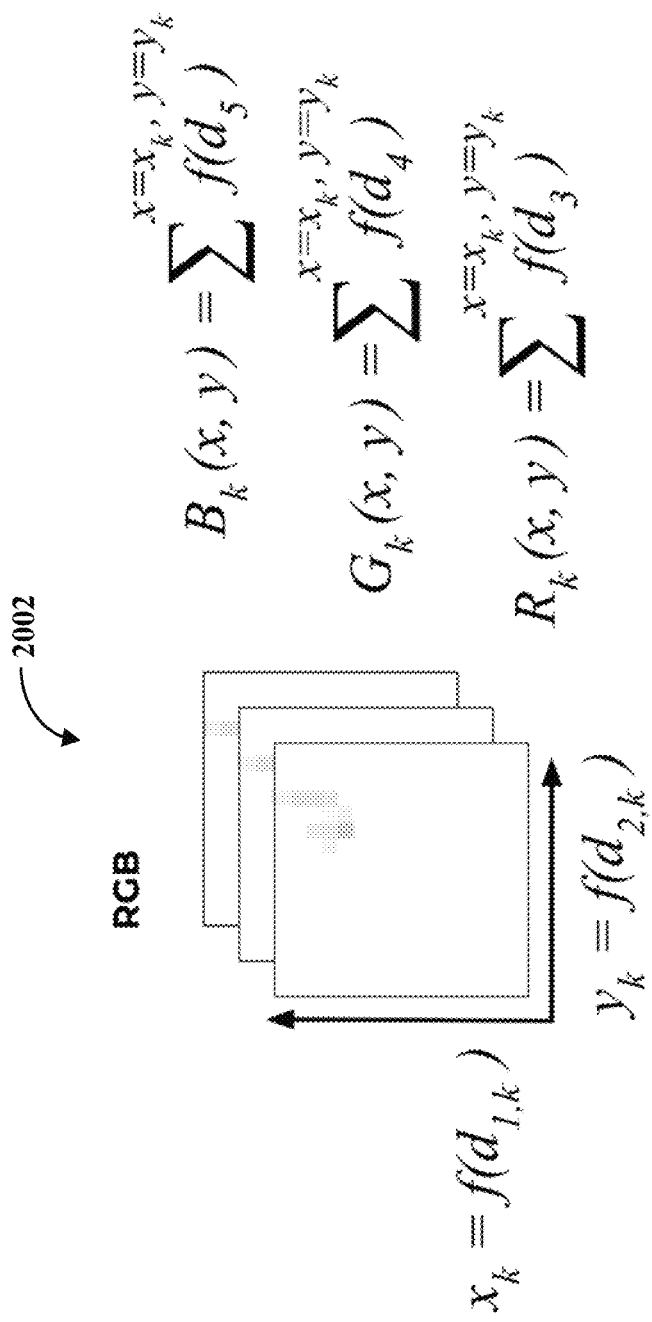
FIG. 20 is a block diagram of an example of generating an image from data points associated with five values.

With additional reference to FIG. 20, the pre-processing design service 1612 may configure the sensing system (e.g., the sensing system 1504) to generate the image 2002 from data points associated with five values. Based on the data points being associated with five values, the image could be constructed as another RGB image. The image 2002 may be generated by mapping: first values of data points (e.g., azimuth or polar angle) to first coordinates of pixels (e.g., locations of pixels referenced by the X-axis of the image, such as in a range from 1 to 8 pixels in rows), which may be expressed by a function given by $X_k=f\Sigma(d_{1,k})$; second values of data points (e.g., height or azimuthal angle) to second coordinates of pixels (e.g., locations of pixels referenced by the Y-axis of the image, such as in a range from 1 to 8 row of pixels in columns), which may be expressed by a function given by $Y_k=f\Sigma(d_{2,k})$; third values of data points (e.g., radius) to intensities of a first color ("R") of the pixels (e.g., brightness of Red in a pixel, such as in a range from 1 to 8 pixels), which may be expressed by a function given by $R_k(x, y)=\Sigma^{x=xk,y=yk} f(d_3)$; fourth values of data points (e.g., SNR) to intensities of a second color ("G") of the pixels (e.g., brightness of Green in a pixel, such as in a range from 1 to 8 pixels), which may be expressed by a function given by $G_k(x, y)=\Sigma^{x=xk,y=yk} f(d_4)$; and fifth values of data points (e.g., time) to intensities of a third color ("B") of the pixels (e.g., brightness of Blue in a pixel, such as in a range from 1 to 8 pixels), which may be expressed by a function given by $B_k(x, y)=\Sigma^{x=xk,y=yk} f(d_5)$. The mapping may be performed by quantizing the first and second values into ranges of the first and second coordinates, quantizing the third values into a range of intensities of the first color of the pixels (Red), quantizing the fourth values into a range of intensities of the second color of the pixels (Green), and quantizing the fifth values into a range of intensities of the third color of the pixels (Blue). The image 2002 may then be processed by a machine learning model trained to process RGB images (e.g., trained for object classification or object detection in color images).

Figure 21:
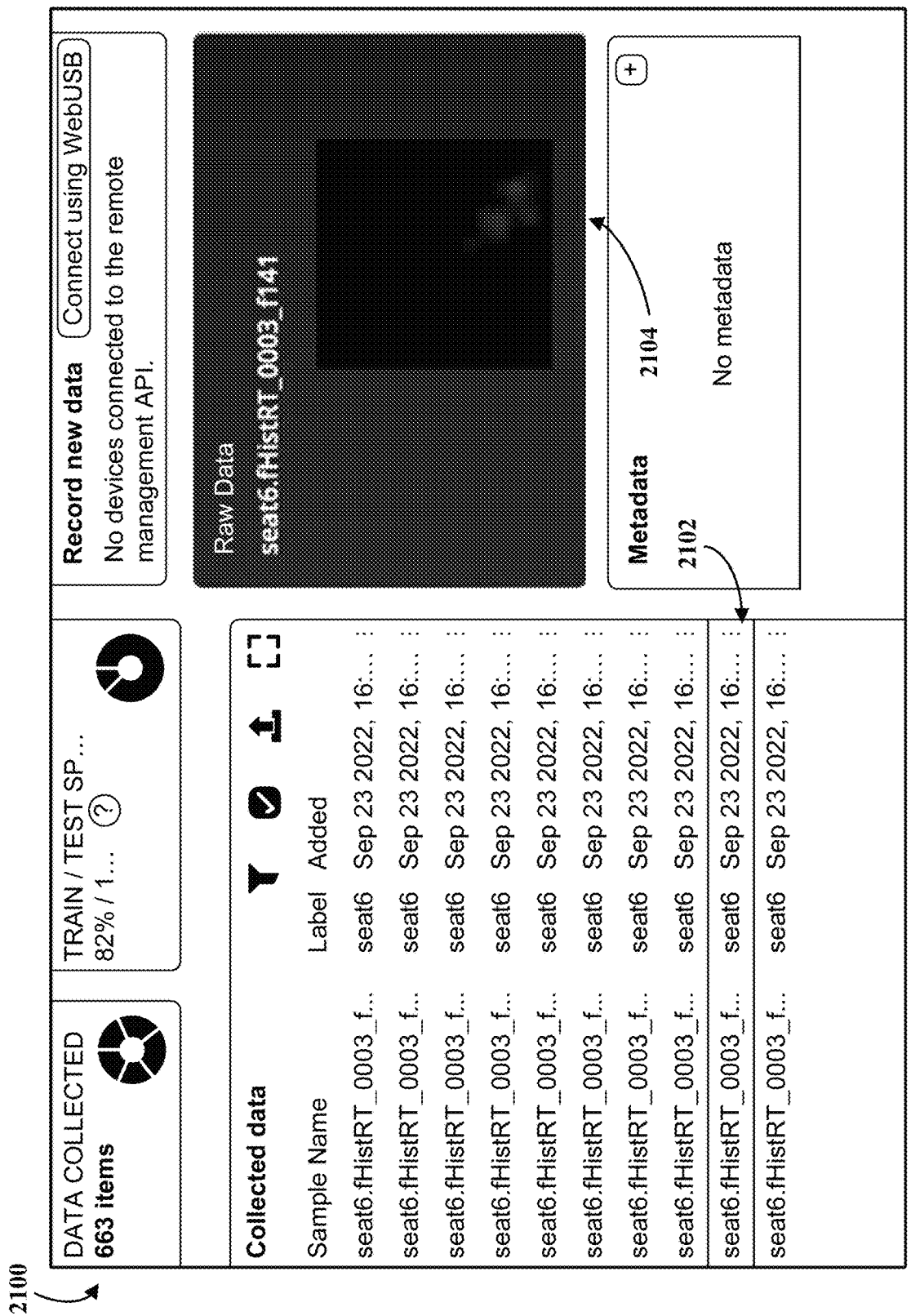
FIG. 21 is an illustration of an example of a GUI for configuring a sensing system for an embedded device.

FIG. 21 is an illustration of an example of a GUI 2100 for configuring a sensing system (e.g., the sensing system 1504) for an embedded device. The GUI 2100 may provide an interactive view to analyze data sets, such as labeled samples of point cloud data (e.g., the point cloud 1508). The GUI 2100 may provide an interactive view to determine parameters for the sensing system, such as configurations of images (e.g., number of pixels for an image, and color depth of the pixels). The GUI 2100 could be output for display at a user interface like the user interface 212 shown in FIG. 2. For example, the GUI 2100 could be output for display to a user at a design control system like the design control system 320 shown in FIG. 16. In some cases, invoking the pre-processing design service 1612 shown in FIG. 16 may cause display of the GUI 2100. The information associated with the GUI 2100 may be accessible via an API.

The GUI 2100 may include indications of multiple collected data sets (e.g., collected via the data ingestion service 312). The data sets may correspond to labeled samples of point cloud data (e.g., different scan frames), such as the point cloud 1508. Selection of a sample of point cloud data, such as point cloud data 2102, may cause the GUI 2100 to display an image 2104 generated based on the sample. The pre-processing design service 1612 may configure the sensing system to construct the image to correspond to a heat map. For example, selection of the point cloud data 2102 may enable viewing the image as a heat map corresponding to the point cloud, such as a greater intensity of pixels in a location of the image that may correspond to a particular activity (e.g., the person 1509 in seat five in the environment 1502).

Figure 22:
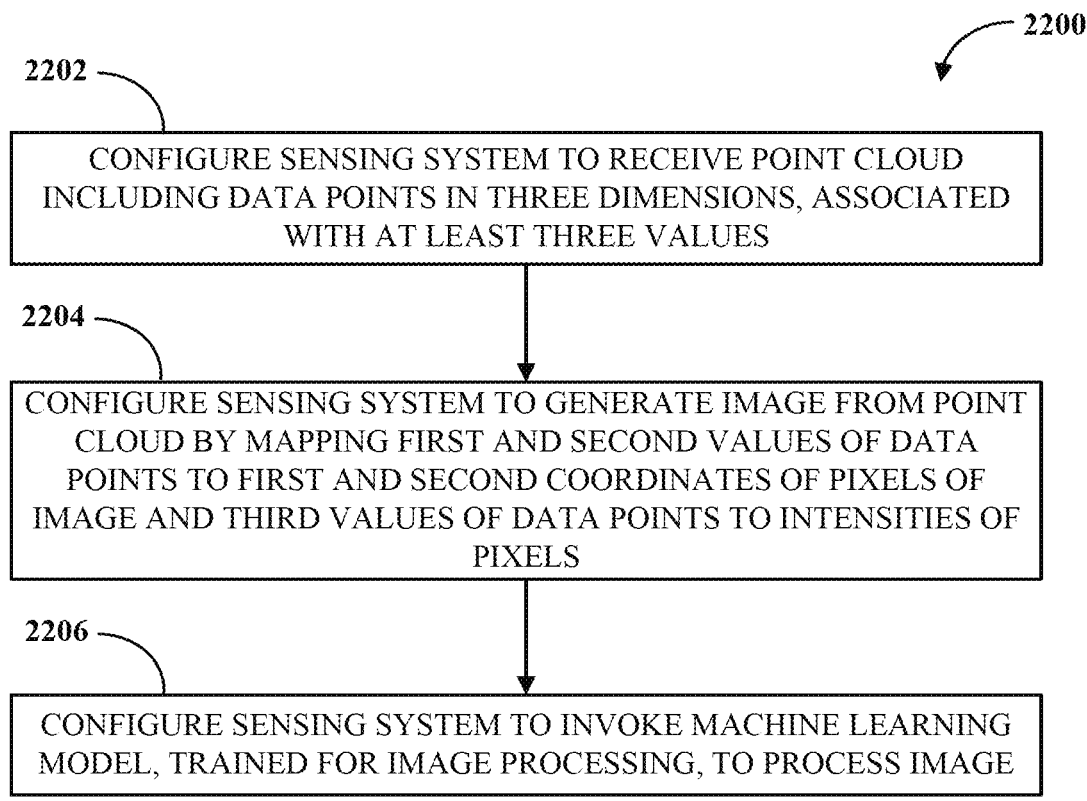
FIG. 22 is a flow chart of an example of a technique for configuring a sensing system for an embedded device.

FIG. 22 is a flow chart of an example of a technique 2200 for configuring a sensing system for an embedded device. The technique 2200 can be executed using computing devices, such as the systems, hardware, and software described with respect to FIGS. 1-21. The technique 2200 can be performed, for example, by executing a machine-readable program or other computer-executable instructions, such as routines, instructions, programs, or other code. The steps, or operations, of the technique 2200 or another technique, method, process, or algorithm described in connection with the implementations disclosed herein can be implemented directly in hardware, firmware, software executed by hardware, circuitry, or a combination thereof.

For simplicity of explanation, the technique 2200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 2202, a configuration service (e.g., the configuration service 1610) may configure a sensing system (e.g., the sensing system 1504) for an embedded device. The configuration service may configure the sensing system to perform multiple the steps, including receiving a point cloud (e.g., the point cloud 1508) including data points in three dimensions (e.g., given by spatial coordinates, such as radius, azimuth, and height in cylindrical coordinates, or radius, polar angle, and azimuthal angle in spherical coordinates, or width, depth, and length in Cartesian coordinates). The data points may be associated with at least three values (e.g., spatial coordinates, SNR, and time relative to other frames).

At 2204, the configuration service may configure the sensing system to generate an image (e.g., the image 1802, the image 1902, the image 2002, or the image 2104) from the point cloud. The image may be generated by mapping first and second values of data points (e.g., azimuth and height) to first and second coordinates of pixels of the image (e.g., locations of pixels of the image, which may be given by X and Y coordinates in a Cartesian coordinate system, such as pixels arranged relative to an X-axis and a Y-axis) and third values of data points (e.g., range) to intensities of the pixels (e.g., brightness of a pixel for a monochrome image, or brightness of one of three colors or channels of a pixel for an RGB image). The mapping may include quantizing the first and second values into ranges of the first and second coordinates and quantizing the third values into a range of the intensities.

In some implementations, the system may also determine a size of the image, including a number of pixels (e.g., 8×8 pixels, or 256×256 pixels). The size of the image may be determined based on a size of the point cloud, including a number of data points. For example, the system may determine the size of the image based on a maximum size of a point cloud, or maximum number of data points, corresponding to a sample. In some implementations, the mapping may include mapping the third values of data points to a first color of the pixels (e.g., Red) and fourth values of data points to a second color of the pixels (e.g., Green). Unused colors could default to zero (e.g., Black, or no color present). In some implementations, the mapping may include mapping the third values of data points to a first color (e.g., Red) and a first portion of a second color (e.g., one half of Green) of the pixels and mapping fourth values of data points to a second portion of the second color (e.g., the other half of Green) and a third color of the pixels (e.g., Blue). In some implementations, the system may select the third values to correspond to the radius of the data points (e.g., a range to an object in three dimensions), so that the image visually results in a heat map (e.g., the image 2104) when displayed by a GUI (e.g., the GUI 2100) for a user.

At 2206, the configuration service may configure the sensing system to invoke a machine learning model to process the image. The machine learning model may be configured by a machine learning design service The machine learning model may be trained for image processing (e.g., computer vision processing), such as object classification or object detection. Object classification may include generating an output indicating a type of object that is detected in the image (e.g., persons or objects, such as persons or objects in particular seats in the environment 1502). Object classification may include generating an output indicating types of objects that are detected in the image (e.g., different persons or objects, such as adults, children, dogs, cats, purses, or briefcases), numbers of objects in the image (e.g., one adult, the person 1509), positions of objects in the image (e.g., in seat five in the environment 1502), or sizes of objects in the image (e.g., an adult or child). As a result, an unordered, variable size point cloud may be translated into a fixed size, normalized heat map image that aggregates data in a consistent manner, which can be conveniently processed with a machine learning model configured for image processing.

Figure 23:
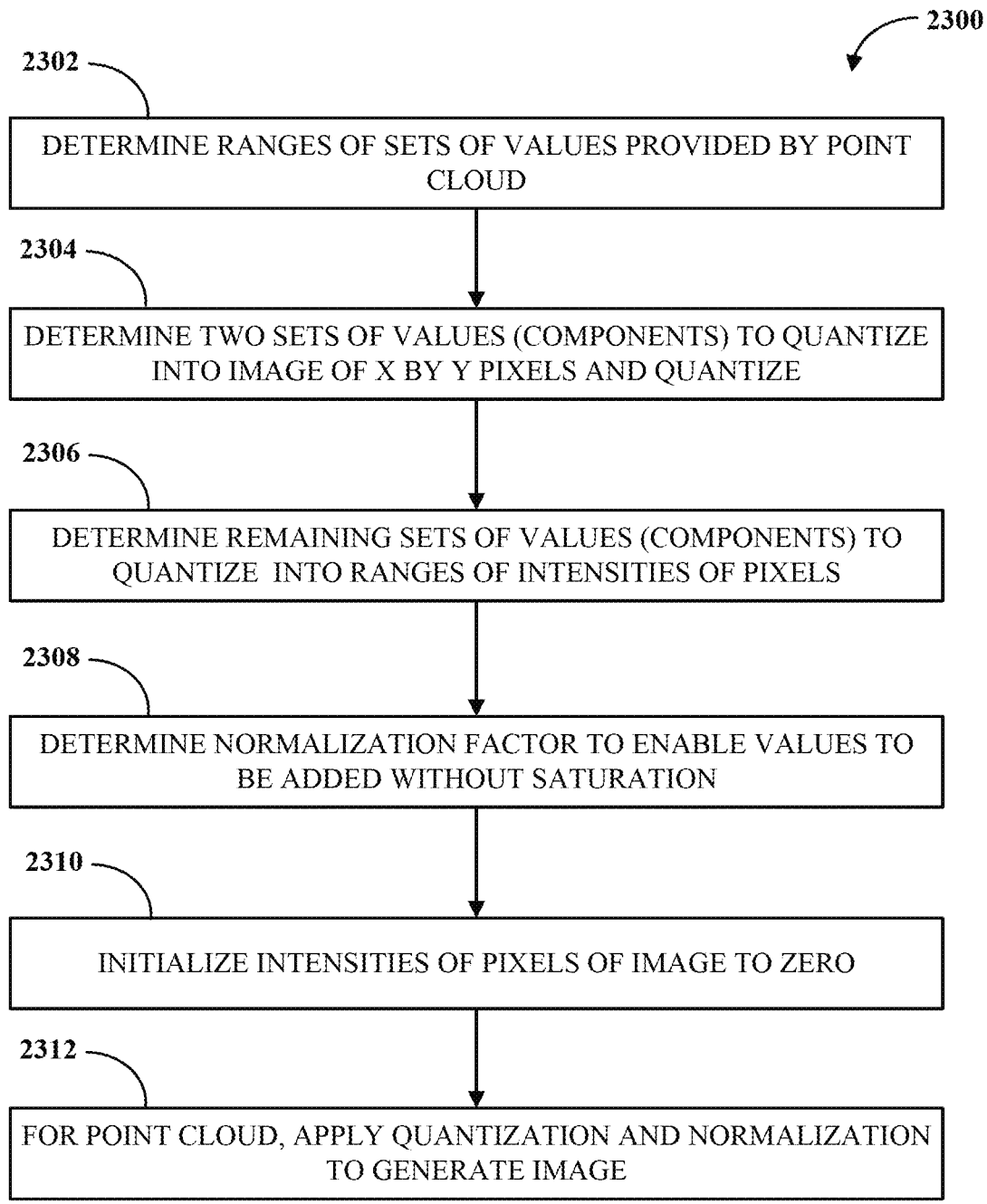
FIG. 23 is a flow chart of an example of a technique for generating an image from a point cloud.

FIG. 23 is a flow chart of an example of a technique 2300 for generating an image from a point cloud. The technique 2300 can be executed using computing devices, such as the systems, hardware, and software described with respect to FIGS. 1-21. The technique 2300 can be performed, for example, by executing a machine-readable program or other computer-executable instructions, such as routines, instructions, programs, or other code. The steps, or operations, of the technique 2300 or another technique, method, process, or algorithm described in connection with the implementations disclosed herein can be implemented directly in hardware, firmware, software executed by hardware, circuitry, or a combination thereof.

For simplicity of explanation, the technique 2300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 2302, a system (e.g., the sensing system 1504), which may be configured by a configuration service (e.g., the configuration service 1610), may determine ranges of sets of values provided by a point cloud (e.g., the point cloud 1508). The system may determine the full range of each axis provided by a point cloud sensor (e.g., the sensor 1506). For example, the sensor could be a millimeter wave sensor configured to provide an azimuth (e.g., a first value) of a data point in the point cloud in the range of 1.3 to −1.3 radians, in addition to four additional measurements (e.g., height, radius, SNR, and time), each with a specific range.

At 2304, the system may determine two sets of values (components) to quantize into an image (e.g., the image 1802, the image 1902, the image 2002, or the image 2104) of X by Y pixels, and may quantize the two sets of values into the X by Y pixels (e.g., into ranges given by a resolution of the images, such as 8 pixels in the X direction and 8 pixels in the Y direction for an image of 8×8 pixels, or 256 pixels in the X direction and 256 pixels in the Y direction for an image of 256 by 256 pixels). Quantizing may enable fitting an entire range from the original signal (e.g., the azimuth, in the range of 1.3 to −1.3 radians) into a range of the image (e.g., 8 pixels arranged relative to an X-axis, for an image of 8×8 pixels).

In some implementations, the quantization into the X by Y pixels may be performed for spatially correlated components (e.g., the azimuth and the height (or elevation) components for polar coordinates, or width and depth components for Cartesian coordinates) to enable presenting a spatial view (e.g., an "overhead" map) of the point cloud (and thus the persons or objects) observed (e.g., a heat map, like the image 2104). In some implementations, this may enable automatically labelling the point cloud (e.g., person in seat five, or seats empty). In some implementations, other point cloud coordinates or intensity components may be used as inputs for the X by Y image space quantization.

At 2306, the system may determine remaining sets of values (components) to quantize into ranges of intensities of pixels. For example, the system may quantize the remaining two or three sets of values or point cloud components (e.g., the radius, the SNR, and the time) into the ranges (e.g., 0-255, for an image having a color depth of 256 bits per pixel) of RGB channels (e.g., three colors, Red, Green, and Blue, each corresponding to a channel) in the image.

At 2308, the system may determine a normalization factor to enable values to be added without saturation. For example, the system may calculate the normalization factor so that the values may be added without saturation when they overlap once quantized in the X by Y image space. For example, depending on the size of an image, when a third dimension is mapped onto a color channel, multiple intensity values may result for a single (X, Y) pixel coordinate.

These multiple values can be added together. To avoid saturation of the resulting color intensity values, a scaling factor (e.g., the normalization) may be applied to each value of intensity. In some implementations, the normalization for a given image size may be obtained by mapping data in a training dataset to an unconstrained dimension (e.g., a dimension that is not limited by a maximum value) and then dividing an upper limit of the intensity of a channel (e.g., 255 for an 8-bit channel) by a maximum sum of overlapping values in the unconstrained dimension.

At 2310, the system may initialize intensities of pixels of images to zero. For example, the system may initialize each of the RGB components (e.g., Red, Green, and Blue) of pixels in the X by Y image to zero (e.g., 0, in the 0-255 range for an image having a color depth of 256 bits per pixel).

At 2312, the system may, for a point cloud observed (e.g., the point cloud 1508), apply the quantizations and normalizations described at 2304, 2306, and 2308 to generate an image. For example, the system may apply the quantizations and normalizations to update values of corresponding Red, Green, or Blue components of the X by Y image.

Some implementations may include a method, comprising configuring a sensing system for an embedded device to perform the steps of generating an image from a point cloud including data points in three dimensions, the data points being associated with at least three values, the image generated by mapping first and second values of a data point to first and second coordinates of a pixel of the image and a third value of the data point to an intensity of the pixel; and invoking a machine learning model to process the image, wherein the machine learning model is trained for image processing. In some implementations, the mapping comprises quantizing the first and second values into ranges of the first and second coordinates and quantizing the third values into a range of the intensities. In some implementations, the mapping comprises determining a size of the image, including a number of pixels, based on a size of the point cloud, including a number of data points. In some implementations, the three dimensions are spatially correlated, the three dimensions include a radius in at least one of cylindrical coordinates or spherical coordinates, and the mapping comprises selecting the third values to correspond to the radius of the data points. In some implementations, a data point is associated with four values, the intensities include first and second colors, and generating the image comprises mapping the third values of data points to a first color of the pixels and fourth values of data points to a second color of the pixels. In some implementations, a data point is associated with four values, the intensities include first, second, and third colors, and generating the image comprises mapping the third values of data points to a first color and a first portion of a second color of the pixels and mapping fourth values of data points to a second portion of the second color and a third color of the pixels. In some implementations, a data point is associated with five values in which three of the five values correspond to the three dimensions and one of the five values corresponds to an SNR. In some implementations, the method comprises configuring a GUI for display at an output interface, the GUI including the image. In some implementations, the method comprises implementing the sensing system on a microcontroller; and receiving the point cloud from a millimeter wave sensor connected to the microcontroller. In some implementations, the sensing system is implemented by a pipeline including a signal processing component and a machine learning component, and the machine learning component includes the machine learning model. In some implementations, the machine learning model is trained to perform object classification by generating an output indicating a type of object that is detected in the image. In some implementations, the machine learning model is trained to perform object detection by generating an output indicating at least one of types of objects that are detected in the image, numbers of objects in the image, positions of objects in the image, or sizes of objects in the image.

Some implementations may include a non-transitory computer readable medium storing instructions operable to cause one or more processors to perform operations comprising configuring a sensing system for an embedded device to perform the steps of generating an image from a point cloud including data points in three dimensions, the data points being associated with at least three values, the image generated by mapping first and second values of data points to locations of pixels of the image arranged relative to an X-axis and a Y-axis and third values of data points to one or more colors of the pixels; and invoking a machine learning model, trained for image processing, to generate an prediction based on the image. In some implementations, the mapping comprises quantizing the first and second values into ranges of the X-axis and the Y-axis and quantizing the third values into a range of the one or more colors. In some implementations, the mapping comprises applying a normalization factor to the third values to prevent saturation of the pixels. In some implementations, the image is a square having an equal number of pixels on the X-axis and the Y-axis.

Some implementations may include an apparatus, comprising a memory; and a processor configured to execute instructions stored in the memory to configure a sensing system for an embedded device to generate an image from a point cloud including data points in three dimensions, the data points being associated with at least three values, the image generated by mapping a first value and a second value of a data point to a location of a pixel of the image and a third value of the data point to an intensity of the pixel; and invoke a machine learning model, trained for computer vision, to generate an output based on the image. In some implementations, the pixels of the image are arranged relative to an X-axis and a Y-axis with each axis in a range up to 256 pixels, and the intensity of a pixel in the image in a range between 0 and 255 bits. In some implementations, the image is monochrome. In some implementations, the image is an RGB image.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an application specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   generating, by a sensing system, an image from a point cloud including data points in three dimensions, the data points being associated with at least three values, wherein the three dimensions are spatially correlated and include a radius in at least one of cylindrical coordinates or spherical coordinates, the image generated by mapping first and second values of a data point to first and second coordinates of a pixel of the image and a third value of the data point to an intensity of the pixel, wherein the mapping includes selecting the third value to correspond to a radius of the data point; and
   invoking a machine learning model to process the image, wherein the machine learning model is trained for image processing.

2. The method of claim 1, wherein the mapping further comprises:
   quantizing the first and second values into ranges of the first and second coordinates and quantizing the third value into a range of the intensities.

3. The method of claim 1, wherein the mapping further comprises:
   determining a size of the image, including a number of pixels, based on a size of the point cloud, including a number of data points.

4. The method of claim 1, wherein the data point is associated with four values, the intensity of the pixel includes a first color and a second color, and generating the image comprises:
   mapping the third value of the data point to the first color and a fourth value of the data point to the second color.

5. The method of claim 1, wherein the data point is associated with four values, the intensity of the pixel includes a first color, a second color, and a third color, and generating the image comprises:
   mapping the third value of the data point to the first color and a first portion of the second color; and
   mapping a fourth value of the data point to a second portion of the second color and the third color.

6. The method of claim 1, wherein the data point is associated with five values in which three of the five values correspond to the three dimensions and one of the five values corresponds to a signal to noise ratio (SNR).

7. The method of claim 1, further comprising:
   configuring a graphical user interface (GUI) for display at an output interface, the GUI including the image.

8. The method of claim 1, further comprising:
   implementing the sensing system on a microcontroller; and
   receiving the point cloud from a millimeter wave sensor connected to the microcontroller.

9. The method of claim 1, wherein the sensing system is implemented by a pipeline including a signal processing component and a machine learning component, and the machine learning component includes the machine learning model.

10. The method of claim 1, wherein the machine learning model is trained to perform object classification by generating an output indicating a type of object that is detected in the image.

11. The method of claim 1, wherein the machine learning model is trained to perform object detection by generating an output indicating at least one of types of objects that are detected in the image, numbers of objects in the image, positions of objects in the image, or sizes of objects in the image.

12. A non-transitory computer readable medium storing instructions operable to cause one or more processors of a sensing system to perform operations comprising:
   generating an image from a point cloud including data points in three dimensions, the data points being associated with at least three values, wherein the three dimensions are spatially correlated and include a radius in at least one of cylindrical coordinates or spherical coordinates, the image generated by mapping first and second values of data points to locations of pixels of the image arranged relative to an X-axis and a Y-axis and third values of data points to one or more colors of the pixels, wherein the mapping includes selecting the third value to correspond to a radius of the data point; and
   invoking a machine learning model, trained for image processing, to generate an prediction based on the image.

13. The non-transitory computer readable medium storing instructions of claim 12, wherein the mapping further comprises:
quantizing the first and second values into ranges of the X-axis and the Y-axis and quantizing the third value into a range of the one or more colors.

14. The non-transitory computer readable medium storing instructions of claim 12, wherein the mapping further comprises:
applying a normalization factor to the third further to prevent saturation of the pixels.

15. The non-transitory computer readable medium storing instructions of claim 12, wherein the image is a square having an equal number of pixels on the X-axis and the Y-axis.

16. An apparatus of a sensing system, comprising:
a memory; and
a processor configured to execute instructions stored in the memory to:
generate an image from a point cloud including data points in three dimensions, the data points being associated with at least three values, wherein the three dimensions are spatially correlated and include a radius in at least one of cylindrical coordinates or spherical coordinates, the image generated by mapping a first value and a second value of a data point to a location of a pixel of the image and a third value of the data point to an intensity of the pixel, wherein the mapping includes selecting the third value to correspond to a radius of the data point; and
invoke a machine learning model, trained for computer vision, to generate an output based on the image.

17. The apparatus of claim 16, wherein the pixels of the image are arranged relative to an X-axis and a Y-axis with each axis in a range up to 256 pixels, and the intensity of a pixel in the image in a range between 0 and 255 bits.

18. The apparatus of claim 16, wherein the image is monochrome.

19. The apparatus of claim 16, wherein the image is an RGB image.

* * * * *